United States Patent
Ueno

(10) Patent No.: US 7,248,424 B2
(45) Date of Patent: Jul. 24, 2007

(54) NONLINEARITY MEASURING METHOD, NONLINEARITY MEASURING UNIT, MAGNETIC RECORDING/REGENERATING UNIT AND LSI FOR MAGNETIC RECORDING/REGENERATING

(75) Inventor: Hiroaki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/120,114

(22) Filed: May 2, 2005

(65) Prior Publication Data
US 2005/0190471 A1     Sep. 1, 2005

Related U.S. Application Data

(63) Continuation of application No. PCT/JP2003/005347, filed on Apr. 25, 2003.

(51) Int. Cl.
    *G11B 5/02*    (2006.01)
(52) U.S. Cl. .......................................... 360/25; 360/53
(58) Field of Classification Search .................... None
    See application file for complete search history.

(56) References Cited

U.S. PATENT DOCUMENTS

| | | | |
|---|---|---|---|
| 5,068,754 A | 11/1991 | Garde | |
| 5,262,904 A | 11/1993 | Tang et al. | |
| 5,583,705 A | 12/1996 | Ziperovich et al. | |
| 5,781,358 A | 7/1998 | Hasegawa | |
| 5,784,296 A * | 7/1998 | Baker et al. | 702/76 |
| 6,934,100 B2 * | 8/2005 | Ueno | 360/31 |

2002/0105744 A1    8/2002  Ueno

FOREIGN PATENT DOCUMENTS

| | | |
|---|---|---|
| JP | 10-172105 | 6/1998 |
| JP | 2975323 | 9/1999 |
| JP | 2002-230709 | 8/2002 |

OTHER PUBLICATIONS

Y. Tang et al.; "A Technique for Measuring Nonlinear Bit Shift"; IEEE Trans. on Mag., vol. 27, No. 6, pp. 5316-5318; Nov. 1991.
X. Che et al.; "A Generalized Frequency Domain Nonlinearity Measurement Method"; IEEE Trans. on Mag., Vo. 30, No. 6; Jun. 1994.
A. Taratorin et al.; "Non-linear Interactions in a Series of Transitions"; IEEE Trans. on Mag., Vo. 33, No. 1; Aug. 1996.

* cited by examiner

*Primary Examiner*—Andrea Wellington
*Assistant Examiner*—Varsha A. Kapadia
(74) *Attorney, Agent, or Firm*—Greer, Burns & Crain, Ltd.

(57) ABSTRACT

A nonlinearity measuring method capable of measuring NLTS with a higher precision while taking the state of magnetization inversion of a preceding bit string into consideration. A constitution includes a first measuring section measuring a first predetermined higher harmonic component from a regenerated signal of the reference signal magnetically recorded on a medium, a second measuring section measuring a second predetermined higher harmonic component from regenerated signals with respect to plural kinds of signals to be measured magnetically recorded on the medium, and a calculating section calculating NLTS from the first component and the second component corresponding to each of the signals, wherein each of plural kinds of signals to be measured includes a magnetization inversion pattern string P1 preceding the objective bit to be measured of NLTS; thereby NLTS depending on the string P1 can be quantitatively measured easily.

20 Claims, 13 Drawing Sheets

FIG. 13

| KIND OF NLTS | NLTS PATTERN TO BE MEASURE | BIT POSITION | | | | | | | | | | | | | | | | | | | | | | | | |
|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| PATTERNS TO BE MEASURED / DIBIT | 000011 | 0 | 0 | 0 | 0 | 1 | 1 | 0 | 0 | 0 | 0 | 0 | 0 | 0 | 0 | 0 | 0 | 0 | 0 | 1 | 0 | 0 | 0 | 0 | 0 |
| | 001011 | 0 | 0 | 1 | 0 | 1 | 1 | 0 | 0 | 0 | 0 | 1 | 0 | 0 | 0 | 0 | 0 | 1 | 0 | 1 | 0 | 0 | 0 | 0 | 0 |
| | 010011 | 0 | 1 | 0 | 0 | 1 | 1 | 0 | 0 | 0 | 0 | 1 | 0 | 0 | 0 | 0 | 1 | 0 | 0 | 1 | 0 | 0 | 0 | 0 | 0 |
| | 011011 | 0 | 1 | 1 | 0 | 1 | 1 | 0 | 0 | 0 | 0 | 0 | 0 | 0 | 0 | 0 | 1 | 1 | 0 | 1 | 0 | 0 | 0 | 0 | 0 |
| | 100011 | 1 | 0 | 0 | 0 | 1 | 1 | 0 | 0 | 0 | 0 | 1 | 0 | 0 | 0 | 0 | 1 | 0 | 0 | 1 | 0 | 0 | 0 | 0 | 0 |
| | 101011 | 1 | 0 | 1 | 0 | 1 | 1 | 0 | 0 | 0 | 0 | 0 | 0 | 0 | 0 | 0 | 1 | 0 | 1 | 0 | 1 | 0 | 0 | 0 | 0 | 0 |
| | 110011 | 1 | 1 | 0 | 0 | 1 | 1 | 0 | 0 | 0 | 0 | 0 | 0 | 0 | 0 | 1 | 1 | 0 | 0 | 1 | 0 | 0 | 0 | 0 | 0 |
| | 111011 | 1 | 1 | 1 | 0 | 1 | 1 | 0 | 0 | 0 | 0 | 1 | 0 | 0 | 0 | 1 | 1 | 1 | 0 | 1 | 0 | 0 | 0 | 0 | 0 |
| TRIBIT | 0000111 | 0 | 0 | 0 | 0 | 1 | 1 | 1 | 0 | 0 | 0 | 1 | 0 | 0 | 0 | 0 | 0 | 0 | 0 | 1 | 1 | 0 | 0 | 0 | 0 |
| | 0010111 | 0 | 0 | 1 | 0 | 1 | 1 | 1 | 0 | 0 | 0 | 0 | 0 | 0 | 0 | 0 | 0 | 1 | 0 | 1 | 1 | 0 | 0 | 0 | 0 |
| | 0100111 | 0 | 1 | 0 | 0 | 1 | 1 | 1 | 0 | 0 | 0 | 0 | 0 | 0 | 0 | 0 | 1 | 0 | 0 | 1 | 1 | 0 | 0 | 0 | 0 |
| | 0110111 | 0 | 1 | 1 | 0 | 1 | 1 | 1 | 0 | 0 | 0 | 1 | 0 | 0 | 0 | 0 | 1 | 1 | 0 | 1 | 1 | 0 | 0 | 0 | 0 |
| | 1000111 | 1 | 0 | 0 | 0 | 1 | 1 | 1 | 0 | 0 | 0 | 0 | 0 | 0 | 0 | 1 | 0 | 0 | 0 | 1 | 1 | 0 | 0 | 0 | 0 |
| | 1010111 | 1 | 0 | 1 | 0 | 1 | 1 | 1 | 0 | 0 | 0 | 1 | 0 | 0 | 0 | 1 | 0 | 1 | 0 | 1 | 1 | 0 | 0 | 0 | 0 |
| | 1100111 | 1 | 1 | 0 | 0 | 1 | 1 | 1 | 0 | 0 | 0 | 1 | 0 | 0 | 0 | 1 | 1 | 0 | 0 | 1 | 1 | 0 | 0 | 0 | 0 |
| | 1110111 | 1 | 1 | 1 | 0 | 1 | 1 | 1 | 0 | 0 | 0 | 0 | 0 | 0 | 0 | 1 | 1 | 1 | 0 | 1 | 1 | 0 | 0 | 0 | 0 |
| REFERENCE PATTERN | | 1 | 0 | 0 | 0 | 0 | 0 | 0 | 0 | 0 | 0 | 0 | 0 | 0 | 0 | 1 | 0 | 0 | 0 | 0 | 1 | 0 | 0 | 0 | 0 |

| BIT POSITION | | | | | | | | | | | | | | | | | | | | | | | | | |
|---|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |

$$\begin{pmatrix} N = 50T \\ M = 5 \\ \delta = 4 \end{pmatrix}$$

NONLINEARITY MEASURING METHOD, NONLINEARITY MEASURING UNIT, MAGNETIC RECORDING/REGENERATING UNIT AND LSI FOR MAGNETIC RECORDING/REGENERATING

This is a continuation of International Application No. PCT/JP2003/005347, filed Apr. 25, 2003.

FIELD OF THE INVENTIONS

The present invention relates to a nonlinearity measuring method, particularly to a magnetic recording/regenerating unit and an LSI for magnetic recording/regenerating, which record and regenerate digital data as changes in magnetization polarities on recording mediums such as a magnetic tape, a magnetic card, a flexible disk, a magnetic disk, a magnetic optical disk and a magnetic drum and, further to a nonlinearity measuring method and a nonlinearity measuring unit in the above-described magnetic recording/regenerating.

DESCRIPTION OF THE RELATED ART

Recently, accompanying the tendency toward higher density in the magnetic recording/regenerating unit and data transmission at a higher speed, in order to comprehend non linear transition shift (NLTS), which is generated in a magnetic head, a recording medium, a transmission system for recording/regenerating or the like, it is indispensable to measure the NLTS. The NLTS is necessary data for magnetically recording data on a recording medium and correctly regenerating the recorded data while taking the transition shift (TS) into consideration to prevent the recording data from being influenced from the recording data immediately before/after it.

As a conventional NLTS measuring method, an article (non-patent document 1) entitled "A Generalized frequency domain nonlinearity measurement method" by X. Che, M. J. Peek and J. Fitzpartick; IEEE Transactions on Magnetics, Vol. 30, 1994, No. 6, pp. 4236 is known. The article describes an measuring method of the NLTS, which is generated by magnetically recording signals of a bit string pattern including continuous magnetization inversions of 2 bits (dibit) on a medium.

The NLTS measuring method will be described below. The NLTS measuring method is constituted of the following three steps.

In step 1, assuming that the pulse width of 1 bit is T, data are recorded on a medium using a reference signal repeating a bit string pattern of 30T in which the polarity inverts every 15 bits (15T), and the fifth higher harmonic signal (hereinafter, referred to as a 5th component) of the regenerated signals thereof is measured. The 5th component is defined as V5ref. The reference signal is shown below using an NRZ expression that expresses recording symbols for data to be recorded on the medium by means of the level; and an NRZI expression, which expresses the recording symbols by means of the inverted level.

NRZ expression: 111111111111111 000000000000000

NRZI expression: 100000000000000 100000000000000

In step 2, the data are recorded on the medium using signals to be measured, which repeat a bit string pattern of 30T including a dibit pattern, and the 5th components V5pat of the regenerated signals are measured. The signals to be measured are expressed below using the NRZ expression and NRZI expression.

NRZ expression: 100000001111111 011111110000000

NRZI expression: 110000001000000 110000001000000

In step 3, a ratio Vab=V5pat/V5ref is calculated using the 5th components V5ref and V5pat, which are measured in the steps 1 and 2. Then, NLTS (dibit), which is generated in the dibit, is calculated using the following formula (a). Here, the NLTS is a value standardized by 1T; i.e., a value in which the pulse width of 1T is defined as 1 (100%).

$$NLTS(\text{dibit}) = a\,\cos[(2-Vab2)/2]*3/\pi \quad\quad (a)$$

The above formula (a) can be approximated by the following formula (b)

$$NLTS(\text{dibit}) = Vab*3/\pi \quad\quad (b)$$

Further, the above article describes an NLTS measuring method as well in the case where the magnetization inversion is further continued. In an article (non-patent document 2) entitled "Non-Linear Interactions in a Series of Transitions", which, in addition to J. Fitzpatrick who is the author of the above article, A. Taratorin, S. X. Wang, and B. Wilson published in IEEE Transactions on Magnetics, Vol. 33, No. 1, pp. 956–961, on January, 1996 after the year 1994, it is described that, in the case where an MR (magnetoresistive effect) type reproducing head is used, if the nonlinearity in the reproducing head is not removed, a large error is generated in the NLTS measured value.

Further, as one of the NLTS, there exists a transition shift (HTS: Hard Transition Shift or O/W (Over Write) NLTS) due to the preceding recorded data. And as a measuring method thereof, the method in which the NLTS is calculated using a reference signal (f) repeating a single bit string pattern and signals to be measured of a ½ frequency thereof (f/2) is known.

Also, in addition to the dibit in which two magnetization inversions are continued, a measuring technique of nonlinearity (refer to a patent document 1), of which purpose is to easily measure various kinds of NLTS without requiring any change in the measuring method, is known. That is, the nonlinear transition shift generated in a tribit, in which three magnetization inversions are continued, or in a signal, in which a bit string pattern of 2T is repeated, can be measured easily without taking much time while reducing errors in measurement with respect to the nonlinearity caused from not only an electromagnetic induction reproducing head but also from an MR (magnetoresistive effect) type reproducing head.

However, in these conventional NLTS measuring methods, there resides the following problem. That is, the state of the magnetization inversion of the bit string preceding the NLTS patterns to be measured (bit string pattern) is not taken into consideration; accordingly, it is not a method of measuring the NLTS, which is in conformity with the actual state.

The present invention has been proposed in view of the above problem. An object of the present invention is to provide a nonlinearity measuring method, a nonlinearity measuring unit, a magnetic recording/regenerating unit and an LSI for magnetically recording/regenerating, which are capable of measuring NLTS with a higher precision while taking into consideration the state of the magnetization inversion in the preceding bit string.

Patent Document 1

Japanese Patent Application Laid-Open (Kokai) No. 2002-230709

Non-Patent Document 1

"A Generalized frequency domain nonlinearity measurement method" by X. Che, M. J. Peek and J. Fitzpartick; 1994, IEEE Transactions on Magnetics, Vol. 30, No. 6, pp. 4236

Non-Patent Document 2

"Non-Linear Interactions in a Series of Transitions" by J. Fitzpatrick, A. Taratorin, S. X. Wang and B. Wilson; IEEE Transactions on Magnetics, January 1996, Vol. 33, No. 1, pp. 956–961

SUMMARY OF THE INVENTION

Accordingly, the nonlinearity measuring method of the present invention, which is a nonlinearity measuring method of calculating non linear transition shift (NLTS) in magnetic recording/regenerating in a medium, includes a recording step of a reference signal to record a reference signal on the medium; a recording step of signals to be measured to record plural kinds of signals to be measured on the medium, a first measuring step to measure a first predetermined higher harmonic component from a regenerated signal of the reference signal magnetically recorded on the medium; a second measuring step to measure a second predetermined higher harmonic component from its regenerated signal with respect to each of the plural kinds of signals to be measured magnetically recorded on the medium; and a calculating step to calculate the NLTS from the first predetermined higher harmonic component and the second predetermined higher harmonic component corresponding to each of the signals to be measured, wherein the plural kinds of signals to be measured include a magnetization inversion pattern string P1, respectively, preceding objective bits to be measured of the NLTS.

Each of the first predetermined higher harmonic component and the second predetermined higher harmonic components may be an M-th higher harmonic component of the M-th order, and each of the reference signal and the plural kinds of signals to be measured is constituted of a bit string with a bit cycle N, the bit cycle N is a multiple number of the M-th order of the predetermined higher harmonic component, and the ratio R (R=N/M) of the bit cycle N with respect to the higher harmonic component M is a multiple number of 2.

Also, the signals to be measured may have a bit string P2, in which the last bit of the NLTS measuring pattern P is excluded, disposed at a following point $2\delta$ bits ($\delta$ is a bit length allowing the influence of the NLTS from a preceding bit on the medium to be neglected) or more away from the last bit of the NLTS measuring pattern string P constituted of the magnetization inversion pattern P1 and objective bit to be measured of the nonlinearity, and yet with a following point of the (n1+0.5) R-th (n1 is a natural number) from the first bit of the NLTS measuring pattern string P assumed to be a starting point, and the signals to be measured include a first magnetization inversion bit C1 at a following point $\delta$ bits or more away from the last bit of the magnetization inversion pattern P1, at a preceding point $2\delta$ bits or more away from the last bit of the signals to be measured, and yet at a following point of the (n2+0.5) R-th (n2 is a natural number) from the last bit of the NLTS measuring pattern string P.

Further, expressing the magnetically inverted bit by 1, the signals to be measured may be a pattern of a 60-bit string (bit cycle N=60) including magnetization inversion positions at the 4th, 5th, 22nd and 35th bits like 0000110000000000000000100000000000000100000000000000000000000.

Also, expressing the magnetically inverted bit by 1, the signals to be measured may be a pattern of a 60-bit string (bit cycle N=60) including magnetization inversion positions at the 4th, 5th, 6th, 12th, 22nd, 23rd, 36th, and 42nd bits like 000011100000100000000011000000000001000001000000000000000000.

Also, when the number of the magnetization inversion bit in the NLTS measuring pattern string P is an odd number, the signal to be measured may include a second magnetization inversion bit C2 at a following point $\delta$ bits or more away from the last bit of the NLTS measuring pattern string P, and yet at a preceding point $\delta$ or more away from the first bit of the bit string P2 pattern; and a third magnetization inversion bit C3 at a following point $\delta$ bits or more away from the first magnetization inversion pattern C1, at a preceding point $\delta$ bits or more away from the last bit of the signals to be measured, and yet at a following point of the (n3+0.5) R-th (n3 is a natural number) from the second magnetization inversion bit C2.

Further, expressing the magnetically inverted bit by 1, the signals to be measured may be a pattern of a 60-bit string (bit cycle N=60) including magnetization inversion positions at the 1st, 2nd, 4th, 5th, 19th, 20th, 22nd and 35th bits like 011011000000000000110100000000000010000000000000000000 00000. Also, expressing the magnetically inverted bit by 1, the signals to be measured may be a pattern of a 60-bit string (bit cycle N=60) including magnetization inversion positions at the 0th, 2nd, 4th, 5th, 18th, 20th, 22nd and 35th bits like 101011000000000000101010000000000001000000000000000000000000.

Furthermore, expressing the magnetically inverted bit by 1, the signals to be measured may be a pattern of a 60-bit string (bit cycle N=60) including magnetization inversion positions at the 0th, 1st, 2nd, 4th, 5th, 12th, 18th, 19th, 20th, 22nd, 35th, and 42nd bits like 111011000000100000111010000000000001000000100000000000000000. Also, expressing the magnetically inverted bit by 1, the signals to be measured may be a pattern of a 60-bit string (bit cycle N=60) including magnetization inversion positions at the 1st, 2nd, 4th, 5th, 6th, 12th, 19th, 20th, 22nd, 23rd, 36th and 42nd bits like 011011100000100000011011000000000001000001000000000000000000.

Furthermore, expressing the magnetically inverted bit by 1, the signals to be measured may be a pattern of a 60-bit string (bit cycle N=60) including magnetization inversion positions at the 0th, 2nd, 4th, 5th, 6th, 12th, 18th, 20th, 22nd, 23rd, 36th, and 42nd bits like 101011100000100000101011000000000001000001000000000000000000. Also, expressing the magnetically inverted bit by 1, the signals to be measured may be a pattern of a 60-bit string (bit cycle N=60) including magnetization inversion positions at the 0th, 1st, 2nd, 4th, 5th, 6th, 18th, 19th, 20th, 22nd, 23rd and 36th bits like 111011100000000000111011000000000001000000000000000000000000.

Also, the reference signal may include a first magnetization inversion bit R1 at the first position; a second magnetization inversion bit R2 at the following point $\delta$ bits or more away from the first magnetization inversion bit R1; a third magnetization inversion bit R3 at the following point $\delta$ bits or more away from the second magnetization inversion bit R2, and yet at the following point of the n4×R-th (n4 is a natural number) from the first magnetization inversion bit R1; and a fourth magnetization inversion bit R4 at a following point $\delta$ bits or more away from the third magnetization inversion bit R3, at a preceding point $\delta$ bits or more away from the last bit of the reference signal, and yet at a following point of the (n5+0.5) R-th (n5 is a natural number) from the second magnetization inversion bit R2.

Furthermore, expressing the magnetically inverted bit by 1, the signals to be measured may be a pattern of a 60-bit string (bit cycle N=60) including magnetization inversion positions at the 0th, 18th, 24th and 48th bits like 100000000000000001000001000000000000000000000 0100000000000.

Further, in the calculating step, the NLTS may be calculated based on the ratio of the first predetermined higher harmonic component and the second predetermined higher harmonic component. Also, the inverted signals to be measured, which are created by inverting the magnetization polarity of the signals to be measured, may be used as the signals to be measured.

Further, in the recording step of signals to be measured, an alteration step for enabling alteration of the recording position of the objective bit to be measured of the nonlinearity in the signals to be measured may be included, and in the second measuring step, the second predetermined higher harmonic component may be measured based on the signals to be measured after alteration of the recording position.

Further, a correction step, in which the second predetermined higher harmonic component is corrected based on the minimum value VpatMin of the second predetermined higher harmonic component measured based on the signals to be measured after alteration of the recording position, may be included. Also, in this correction step, when the second predetermined higher harmonic component measured based on the signals to be measured before alteration of the recording position is defined as Vpat and the second predetermined higher harmonic component measured based on the signals to be measured after alteration of the recording position is defined as Vpat', the correction may be made so that $Va'=\mathrm{Sqrt}(Vpat^2-VpatMin^2)$.

Further, each of the reference signal and the plural kinds of signals to be measured may be a bit string with a bit cycle 60 (N=60), and each of the first predetermined higher harmonic component and the second predetermined higher harmonic component is a fifth higher harmonic component of the 5th order (M=5). Also, each of the reference signal and the plural kinds of signals to be measured may be a bit string with a bit cycle 50 (N=50), and each of the first predetermined higher harmonic component and the second predetermined higher harmonic component is a fifth higher harmonic component of the 5th order (M=5).

Also, the nonlinearity measuring unit of the present invention is a nonlinearity measuring unit for calculating non linear transition shift (NLTS) in magnetic recording/regenerating in a medium, including: a first measuring section measuring a first predetermined higher harmonic component from a regenerated signal of a reference signal magnetically recorded on the medium; a second measuring section measuring a second predetermined higher harmonic component from its regenerated signal with respect to each of the plural kinds of signals to be measured magnetically recorded on the medium; and a calculating section calculating the NLTS from the first predetermined higher harmonic component and the second predetermined higher harmonic component corresponding to each of the signals to be measured, wherein the plural kinds of signals to be measured include a magnetization inversion pattern string P1, respectively, preceding objective bits to be measured of the NLTS.

Further, the magnetic recording/regenerating unit of the present invention is a magnetic recording/regenerating unit, including: a first measuring section measuring a first predetermined higher harmonic component from a regenerated signal of a reference signal magnetically recorded on a medium; a second measuring section measuring a second predetermined higher harmonic component from its regenerated signal with respect to each of the plural kinds of signals to be measured magnetically recorded on the medium; and a calculating section calculating non linear transition shift (NLTS) in magnetic recording/regenerating in the medium from the first predetermined higher harmonic component and the second predetermined higher harmonic component corresponding to each of the signals to be measured, wherein the plural kinds of signals to be measured include a magnetization inversion pattern string P1, respectively, preceding objective bits to be measured of the NLTS.

Also, the LSI for magnetic recording/regenerating of the present invention includes a first measuring section measuring a first predetermined higher harmonic component from a regenerated signal of a reference signal magnetically recorded on a medium; a second measuring section measuring a second predetermined higher harmonic component from its regenerated signal with respect to each of the plural kinds of signals to be measured magnetically recorded on the medium; and a calculating section calculating non linear transition shift (NLTS) in magnetic recording/regenerating in the medium from the first predetermined higher harmonic component and the second predetermined higher harmonic component corresponding to each of the signals to be measured, wherein the plural kinds of signals to be measured include a magnetization inversion pattern string P1, respectively, preceding objective bits to be measured of the NLTS.

According to the nonlinearity measuring method, the nonlinearity measuring unit, the magnetic recording/regenerating unit and the LSI for magnetic recording/regenerating of the present invention exercise the following effects and advantages.

(1) Since the NLTS is calculated based on the predetermined higher harmonic component of signals to be measured including the magnetization inversion pattern string P1 preceding the objective bit to be measured of the NLTS, the NLTS depending on the magnetization inversion pattern string P1 can be quantitatively measured easily. Thus, a large effect is exercised in developing magnetic recording/regenerating units (magnetic head, electric transmission system or the like) and mediums.

(2) The correction can be easily made so that the NLTS is minimized.

BRIEF DESCRIPTION OF THE DRAWINGS

FIG. 13 is a diagram showing an example of the other reference pattern and patterns to be measured, which are used in the nonlinearity measuring section of the magnetic disk unit as an embodiment of the present invention.

DESCRIPTION OF THE PREFERRED EMBODIMENT(S)

Figure 1:
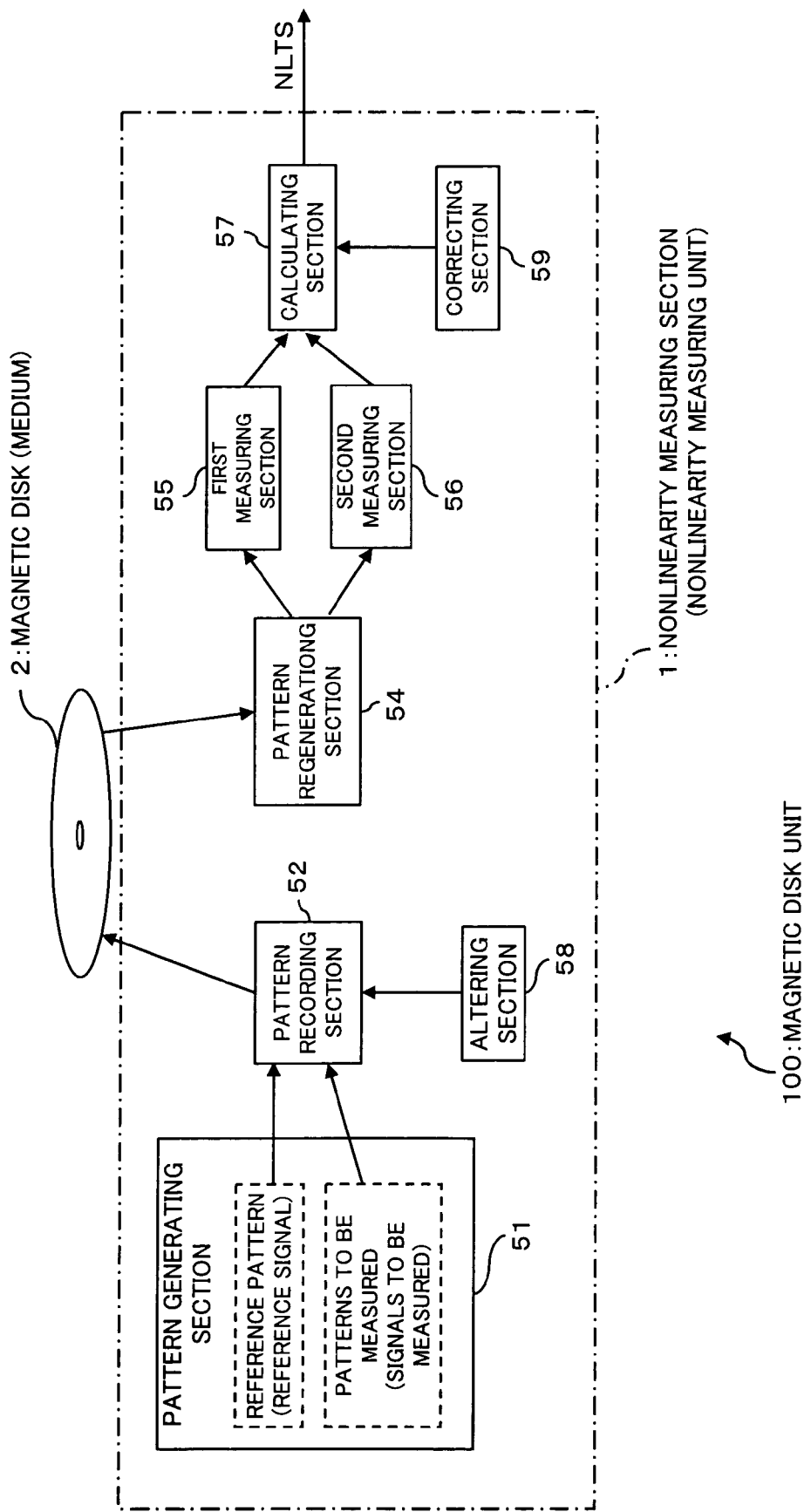
FIG. 1 is a diagram schematically showing a functional configuration of a nonlinearity measuring section (nonlinearity measuring unit), which is provided in a magnetic disk unit (magnetic recording/regenerating unit) as an embodiment of the present invention.

Now, referring to the drawings, embodiments of the present invention will be described.

FIG. 1 is a diagram schematically showing a functional configuration of a nonlinearity measuring section (nonlinearity measuring unit), which is provided in a magnetic disk unit (magnetic recording/regenerating unit) as an embodiment of the present invention.

The magnetic disk unit (magnetic recording/regenerating unit) 100 is used as, for example, a storing device in a computer system or the like. The magnetic disk unit 100 is provided with a plurality of magnetic disks 2 to perform data recording/reading using a magnetic head 3 for the magnetic disks 2. The magnetic disk unit 100 is constituted of a nonlinearity measuring section 1 (refer to FIG. 1) for calculating non-linear transition shift (NLTS) in magnetic recording/regenerating in the magnetic disks (medium) 2 (refer to FIG. 3).

As shown in FIG. 1, the nonlinearity measuring section 1 in the magnetic disk unit 100 is constituted of a pattern generating section 51, a pattern recording section 52, a pattern regenerating section 54, a first measuring section 55, a second measuring section 56, a calculating section 57, an altering section 58 and a correcting section 59.

The pattern generating section 51 is adapted so as to generate a reference pattern (reference signal) and patterns to be measured (signals to be measured), and to send the reference pattern and the patterns to be measured to the pattern recording section 52.

Figure 2:
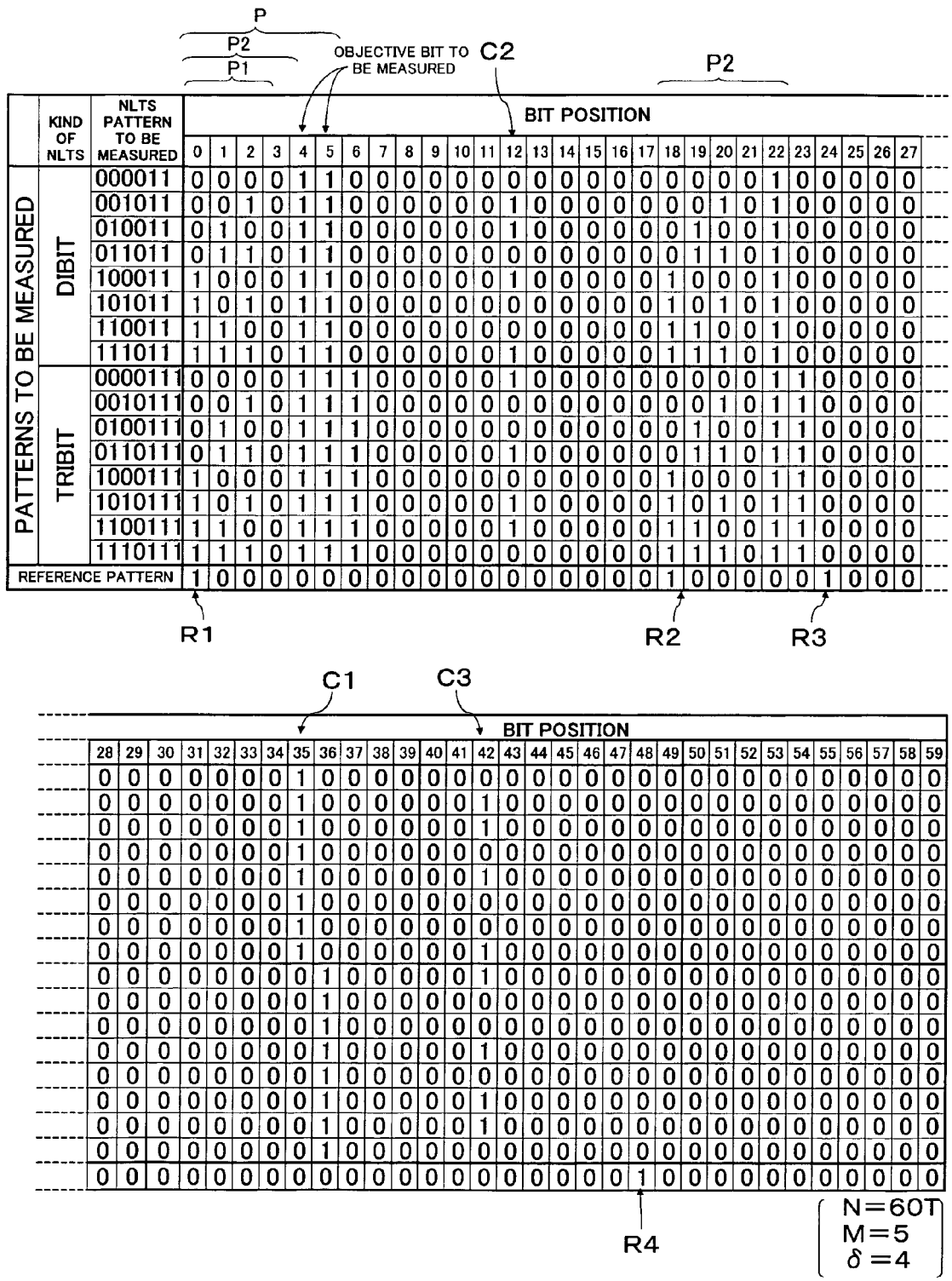
FIG. 2 is a diagram showing an example of a reference pattern and patterns to be measured, which are used in the nonlinearity measuring section of the magnetic disk unit as an embodiment of the present invention.

FIG. 2 is a diagram showing an example of the reference pattern and the patterns to be measured, which are used in the nonlinearity measuring section 1 of the magnetic disk unit 100 as an embodiment of the present invention. Both of the reference pattern and the patterns to be measured are a bit string pattern, respectively, that represents the state of magnetization and non-magnetization for magnetically recording data on the magnetic disk 2. The pattern generating section 51 is adapted so as to generate the reference pattern and the patterns to be measured as shown in FIG. 2.

In FIG. 2, items of the respective strings are listed in the top row. From the left in order, the items are the kind of measurement of NLTS in the first column; the NLTS pattern to be measured in the second column; and the bit positions thereof in the third column. As for the bit positions, the reference pattern and the patterns to be measured are indicated in a manner of the NRZI expression. The adaptation is made so that data selected from these patterns are supplied from the pattern generating section 51 as the recording data.

In this embodiment, as shown in FIG. 2, both of the reference pattern and the patterns to be measured are a bit string, respectively, which are constituted of 0 and 1 of 60 bits (60T; N=60) with a bit cycle N, and the magnetization inversion position is represented by 1.

In FIG. 2, in each of the reference pattern and the patterns to be measured, bits from the first bit through the last bit constituting each pattern are given with a number of 0 through 59 in order as the bit position to identify the magnetization inversion position in each of the NLTS patterns to be measured. In each of the patterns shown in FIG. 2, the bit length is δ=4T in which the influence from the preceding bit is negligible.

In this embodiment, as shown in FIG. 2, the reference pattern is formed as a pattern, which has a bit string including the magnetization inversion positions at the 0th, 18th, 24th and 48th bits respectively.

Also, in the example shown in FIG. 2, the patterns to be measured have two kinds of NLTS of a dibit pattern and a tribit pattern. Further, the dibit pattern includes 8 kinds of NLTS patterns to be measured; and the tribit pattern includes 8 kinds of NLTS patterns to be measured.

Here, the dibit pattern means a pattern including a dibit in which two magnetization inversions are continued ( . . . 00110000 . . . ); and the tribit pattern means a pattern including a tribit in which three magnetization inversions are continued ( . . . 00111000 . . . ).

Also, each of the dibit patterns shown in FIG. 2 includes a 2-bit successive magnetization inversion position (dibit) at the 4th and 5th bits from the first bit; and at the 0th bit through the third bit preceding each dibit, a 4-bit magnetization inversion pattern string (preceding pattern) P1 is included, respectively.

In this embodiment, for convenience, in each dibit pattern, each of the NLTS patterns to be measured will be discriminated using a 6-bit part (NLTS measuring pattern string P) from the 0th through 5th bits constituted of the preceding pattern P1 and the dibit. For example, the NLTS patterns to be measured are represented as an NLTS pattern to be measured 000011, an NLTS pattern to be measured 001011, an NLTS pattern to be measured 010011 or the like.

For example, in the case of the NLTS pattern to be measured 000011, magnetization inversion positions are included at the 4th, 5th, 22nd and 35th bits; in the case of the NLTS pattern to be measured 011011, magnetization inversion positions are included at the 1st, 2nd, 4th, 5th, 19th, 20th, 22nd and 35th bits; in the NLTS pattern to be measured 101011, magnetization inversion positions are included at the 0th, 2nd, 4th, 5th, 18th, 20th, 22nd and 35 bits; in the case of the NLTS pattern to be measured 111011, the magnetization inversion positions are included at the 0th, 1st, 2nd, 4th, 5th, 12th, 18th, 19th, 20th, 22nd, 35th, 42nd bits.

In this embodiment, the NLTS is measured with respect to the dibit positions (2nd bit in the two successive magnetization inversion bits constituting the dibit) in each of the NLTS patterns to be measured. That is, the bits at these dibit positions are the objective bits to be measured.

Likewise, each of the tribit patterns shown in FIG. 2 includes a 3-bit successive magnetization inversion position (tribit) at the 4th bit through the 6th bit from the first bit, and includes a 4-bit magnetization inversion pattern string (preceding pattern) P1, which is different from each other, in the 0th bit through the 3rd bit preceding each tribit.

In this embodiment, for convenience, each of the NLTS patterns to be measured will be discriminated using a 7-bit part from the 0th through the 6th bits constituted of the preceding pattern P1 and the tribit in each tribit pattern. For example, the NLTS patterns to be measured are represented as an NLTS pattern to be measured 0000111, an NLTS pattern to be measured 0010111, an NLTS pattern to be measured 0100111 or the like.

For example, in the case of the NLTS pattern to be measured 0000111, the magnetization inversion positions are included at the 4th, 5th, 6th, 12th, 22nd, 23rd, 36th and 42nd bits; in the case of the NLTS pattern to be measured 0110111, the magnetization inversion positions are included at the 1st, 2nd, 4th, 5th, 6th, 12th, 19th, 20th, 22nd, 23rd, 36th and 42nd bits; in the case of the NLTS pattern to be measured 1010111, the magnetization inversion positions are included at the 0th, 2nd, 4th, 5th, 6th, 12th, 18th, 20th, 22nd, 23rd, 36th, and 42nd bits; and in the case of the NLTS pattern to be measured 1110111, the magnetization inversion positions are included at the 0th, 1st, 2nd, 4th, 5th, 6th, 18th, 19th, 20th, 22nd, 23rd, 36th bits.

In this embodiment, the NLTS is measured with respect to the tribit positions (the 3rd bit in the three successive magnetization inversion bits, which constitute the tribit) in each of the NLTS patterns to be measured. That is, the bits at these tribit positions are the objective bits to be measured.

The pattern recording section (reference signal recording section and signals-to-be-measured recording section) 52 records the reference pattern and the patterns to be measured, which are generated by the pattern generating section 51, in the magnetic disk 2. The pattern regenerating section 54 reads out the reference pattern and the patterns to be measured, which are recorded in the magnetic disk 2, and regenerates the same.

The first measuring section 55 measures a first predetermined higher harmonic component (M-th component) from the regenerated signal of the reference signal, which is magnetically recorded in the magnetic disk 2. The first measuring section 55 is adapted so as to measure the fifth higher harmonic component (hereinafter, sometimes referred to as a 5th component) Vref based on the reference pattern regenerated by the pattern regenerating section 54.

The second measuring section 56 measures, with respect to each of a plural kinds of signals to be measured, which are magnetically recorded in the magnetic disk 2, a second predetermined higher harmonic component (M-th component) from the regenerated signals. The second measuring section 56 is adapted so as to measure the fifth higher harmonic component Vpat based on the patterns to be measured (NLTS pattern to be measured) regenerated by the pattern regenerating section 54.

The adaptation is made so that the reference pattern (reference signal) generated by the pattern generating section 51 is recorded in the magnetic disk 2 via the pattern recording section 52, and the data recorded in the magnetic disk 2 are inputted into the first measuring section 55 via the pattern regenerating section 54. Likewise, the adaptation is made so that the patterns to be measured (signals to be measured) generated by the pattern generating section 51 are recorded in the magnetic disk 2 via the pattern recording section 52, and the data recorded in the magnetic disk 2 are inputted into the second measuring section 52 via the pattern regenerating section 54.

Hereinafter, in this embodiment, both of the first predetermined higher harmonic component, which is measured by the first measuring section 55, and the second predetermined higher harmonic component, which is measured by the second measuring section 56, will be described as to the case of the fifth higher harmonic component with the 5th order (M=5).

The calculating section 57 calculates the NLTS from the first predetermined higher harmonic component, which is measured by the first measuring section 55, and the second predetermined higher harmonic component corresponding to each of the signals to be measured, which are measured by the second measuring section 56.

In particular, the calculating section 57 is adapted so as to calculate the Vab first using the formula (1) below, and then, to calculate the NLTS using the formula (2) below.

$$Vab = V\text{pat}/V\text{ref} \quad (1)$$

wherein, Vpat is the M-th component in the patterns to be measured; and Vref is the M-th component in the reference pattern.

$$NLTS = \frac{R/2}{\pi}a\cos(1 - Vab^2) \quad (2)$$

R is a ratio (R=N/M) of the bit cycle N with respect to the order number M of the higher harmonic component. For example, in the case where the bit cycle N is 60 bits (60T; N=60); and a predetermined higher harmonic component is of order 5 (M=5), R=(60/5)=12. That is, the NLTS can be calculated using the following formula (3).

$$NLTS = \frac{6}{\pi}a\cos(1 - Vab^2) \quad (3)$$

Here, the NLTS is a value standardized by 1T; i.e., a value when the pulse width of 1T is defined as 1 (100%).

Next, the above NLTS calculation formula (3) will be described using the NLTS pattern to be measured 1010111 (pattern A) with respect to a tribit with a bit cycle (pattern cycle) of 60T.

(1) Calculation of the Fifth Component of the Pattern A

The magnetization inversion positions of the pattern A are included at the 0th, 2nd, 4th, 5th, 6th, 12th, 18th, 20th, 22nd, 23rd, 36th and 42nd bits. Here, the NLTS of a 1-bit preceding magnetization inversion normalized by the bit cycle T is defined as tn1; the NLTS of a 2-bit preceding magnetization inversion normalized by the bit cycle T is defined as tn2; the NLTS of a 3-bit preceding magnetization inversion normalized by the bit cycle T is defined as tn3 (=tn1−tn2); and the NLTS normalized by the previous value is defined as tow. The wording "previous value" means the data before being over written.

$$Va(t) = h(t) - h(t - 2T - tow + tn2) + h(t - 4T - tn2) -$$
$$h(t - 5T - tow + tn1) + h(t - 6T + tn3) -$$
$$h(t - 12T - tow) + h(t - 18T) - h(t - 20T - tow) +$$
$$h(t - 22T + tn2) - h(t - 23T - tow + tn1) +$$
$$h(t - 36T) - h(t - 42T - tow)$$

-continued
$$Va(f) = H(f)[\exp(0) - \exp(-j\omega T(2 + tow - tn2)) +$$
$$\exp(-j\omega T(4 - tn2)) - \exp(-j\omega T(5 + tow - tn1)) +$$
$$\exp(-j\omega T(6 - tn3)) - \exp(-j\omega T(12 + tow)) +$$
$$\exp(-j\omega T(18)) - \exp(-j\omega T(20 + tow - tn2)) +$$
$$\exp(-j\omega T(22 - tn2)) - \exp(-j\omega T(23 + tow - tn1)) +$$
$$\exp(-j\omega T(36)) - \exp(-j\omega T(42 + tow))]$$

Since the fifth component is 5f0=5/T0=5/(60T)=1/(12T), ωT=2πfT=2π5f0T=π/6.

Here, f0 represents a repetitive reference frequency. Accordingly, the fifth component Va(5f0) of the Va(f) is represented by the following formula.

$$Va(5f0) = H(5f0)[1 - \exp(-j\pi/6(2 + tow - tn2)) +$$
$$\exp(-j\pi/6(4 - tn2)) - \exp(-j\pi/6(5 + tow - tn1)) +$$
$$\exp(-j\pi/6(6 - tn3)) - \exp(-j\pi/6(12 + tow)) +$$
$$\exp(-j\pi/6(18)) - \exp(-j\pi/6(20 + tow - tn2)) +$$
$$\exp(-j\pi/6(22 - tn2)) - \exp(-j\pi/6(23 + tow - tn1)) +$$
$$\exp(-j\pi/6(36)) - \exp(-j\pi/6(42 + tow))]$$
$$Va(5f0) = H(5f0)[1 - \exp(-j\pi/6(2 + tow - tn2)) +$$
$$\exp(-j\pi/6(4 - tn2)) - \exp(-j\pi/6(5 + tow - tn1)) -$$
$$\exp(-j\pi/6(-tn3)) - \exp(-j\pi/6(tow)) - 1 +$$
$$\exp(-j\pi/6(2 + tow - tn2)) - \exp(-j\pi/6(4 - tn2)) +$$
$$\exp(-j\pi/6(5 + tow - tn1)) + 1 + \exp(-j\pi/6(tow))]$$

$$Va(5f0)=H(5f0)[1-\exp(j\pi/6(tn3))] \quad (4)$$

(2) Calculation of the Fifth Component of the Reference Pattern (Pattern B)

Likewise, the fifth component Vb(5f0) of the basic pattern is calculated.

The magnetization inversion positions of the pattern B are included at the 0th, 18th, 24th and 48th bits.

$$Vb(5f0) = H(5f0)[1 - \exp(-j\pi/6(18 + tow)) + \quad (5)$$
$$\exp(-j\pi/6(24)) - \exp(-j\pi/6(48 + tow))]$$
$$= H(5f0)$$

(3) Derivation of an NLTS Calculation Formula

First, Vab=Va(5f0)/Vb(5f0) is calculated. Here, since Va(5f0) and Vb(5f0) are measured by a spectrum analyzer or the like, only the absolute value is measured. Accordingly, from the above formulas (4) and (5), $$Vab = |Va(5f0)|/|Vb(5f0)| = |1 - \exp(j\pi/6(tn3))|/|2|$$

Here, defining the actual number part of the exp(jπ/6*tn3) as Re, and the imaginary number part as Im, $$Vab = sqrt[(1 - Re) \wedge 2 + Im \wedge 2]/2 = sqrt(2 - 2Re)/2 \ h$$

The actual number part Re is:

$$Re=1-2Vab^2$$

Therefore, a phase angle φ is:

$$\phi=a\cos(Re)=a\cos(1-2Vab^2)$$

From viewpoint of the 5th component of f0, since T is π/6, an NLTS amount with respect to 1T is calculated by the following formula (6).

$$NLTS=6/\pi a\cos(1-2Vab^2) \quad (6)$$

As for the other NLTS patterns to be measured, the calculation formula of the NLTS is the same as the above.

The altering section 58 arbitrarily alters (shifts) the recording position of at least a part of the bits when the NLTS patterns to be measured (patterns to be measured) are recorded in the magnetic disk 2 by the pattern recording section 52. Owing to this, the NLTS value can be simulated, by altering the dibit position or tribit position; or the value of the M-th component Vpat in the patterns to be measured can be simulated.

The correcting section 59, which corrects the value of the M-th component Vpat in the patterns to be measured, is adapted so as, based on the simulation result by the altering section 58, to correct the value of the M-th component Vpat in the patterns to be measured using the minimum value VpatMin in the values of the Vpat. In this embodiment, the correcting section 59 is adapted so as, for example, to correct the value by calculating the value Vpat' of the corrected Vpat based on the following formula (7).

$$Vpat'=\sqrt{Vpat^2-VpatMin^2} \quad (7)$$

The formula (7) also can be expressed as below:

$$Vpat'=Sqrt(Vpat^2-VpatMin^2)$$

The NLTS measuring technique using the nonlinearity measuring section 1 of the magnetic disk unit 100 is a technique of measuring nonlinearity shift at the magnetization transition points. In the magnetic recording, the nonlinearity of the magnetic head (reproducing head) 3, the nonlinearity of regenerated amplitude due to the ρ-H curve nonlinearity or the like are also included. Since the nonlinearity of the regenerated amplitude may generate an error in measurement of the NLTS obtained by this technique, the error is preferably corrected.

Figure 3:
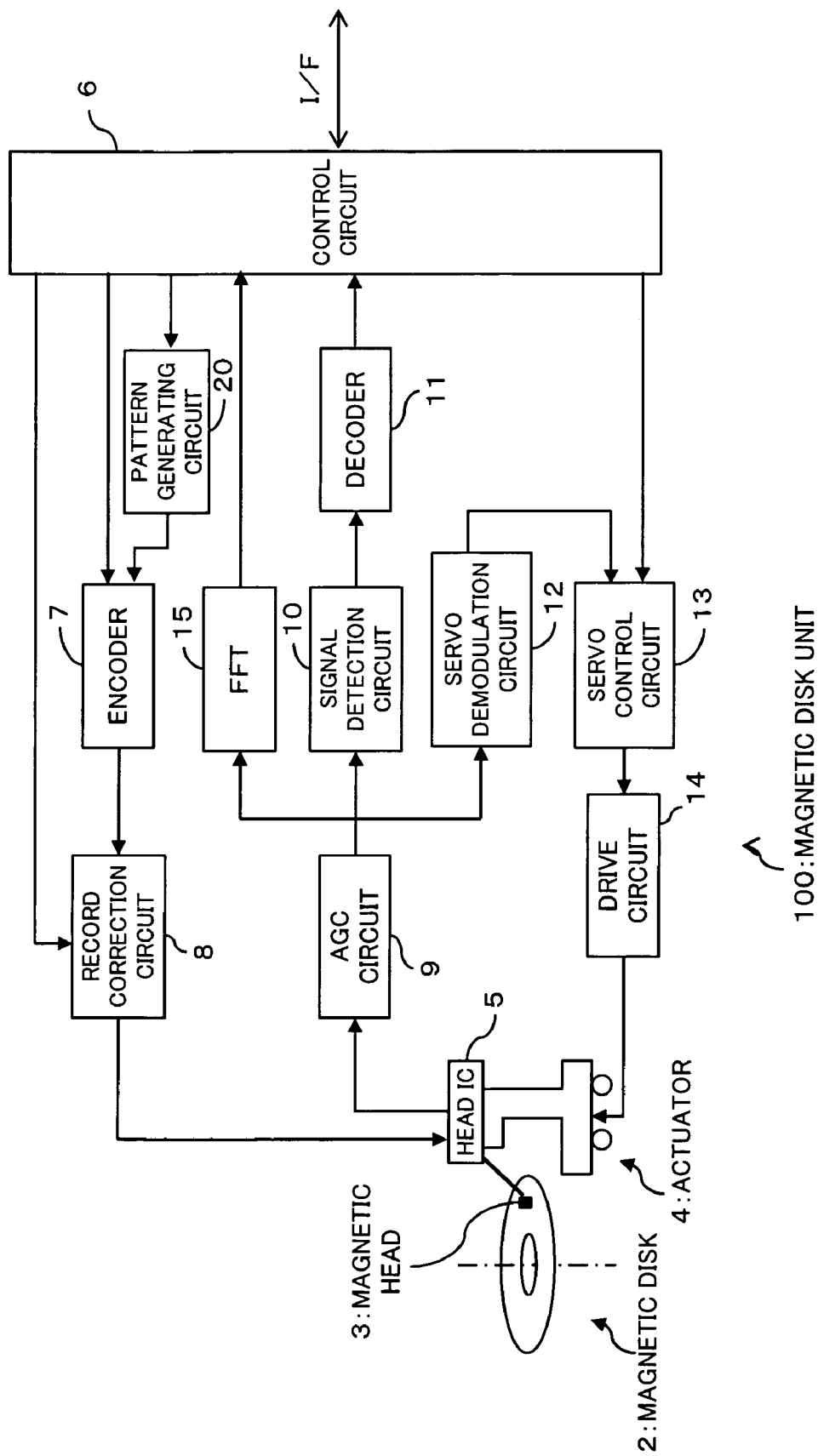
FIG. 3 is a diagram schematically showing a hardware configuration of the magnetic disk unit as an embodiment of the present invention.

FIG. 3 is a diagram schematically showing a hardware configuration of a magnetic disk unit 100 as an embodiment of the present invention. As shown in FIG. 3, the magnetic disk unit 100 is constituted of a magnetic disk (medium) 2, a magnetic head (pattern recording section and pattern regenerating section) 3, an actuator 4, a head IC 5, a control circuit 6, an encoder 7, a record correction circuit 8, an AGC circuit 9, a signal detection circuit 10, a decoder 11, a servo demodulation circuit 12, a servo control circuit 13, a drive circuit 14, an FFT 15 and a pattern generating circuit 20.

The magnetic disk (medium) 2, which has tracks formed on a disk-like medium by utilizing a high retentive magnetic film, is adapted so as to be rotated by a spindle motor (not shown), and the magnetic head 3 is adapted so as to read out data recorded on its surface or write data.

The magnetic head (pattern recording section and pattern regenerating section) 3 reads out various kinds of data recorded on the magnetic disk 2 and writes various kinds of data on the magnetic disk 3. In particular, the magnetic head 3, which is disposed facing to the magnetic disk 2, is adapted so as, when a recording current is supplied, to generate a magnetic field. The magnetic head 3 is adapted so as, by magnetizing the magnetic disk 2 in the direction of travel on the track, to record various kinds of data (reference pattern and patterns to be measured, which will be describe in detail later) on the magnetic disk 2.

That is, the magnetic head 3 functions as the pattern recording section 52 (recording section of the reference signal and recording section of the signals to be measured) that writes the above-described reference pattern and patterns to be measured on the magnetic disk 2; and functions as the pattern regenerating section 54 that reads out and regenerates the reference pattern and the patterns to be measured recorded on the magnetic disk 2.

The actuator 4, which is for shifting the magnetic head 3 in the radius direction of the magnetic disk 2, is constituted of, for example, a VCM (Voice Coil Motor) (not shown) or the like used for positioning of the magnetic head 3. The actuator 4 is adapted so as to be driven responding to the drive signals from the drive circuit 14 to shift the magnetic head 3 to a predetermined position.

The head IC 5 controls data reading/writing on the magnetic disk 2 with the magnetic head 3. The encoder 7 converts the recording data, which are supplied from the control circuit 6, and the reference pattern and patterns to be measured, which are generated by the pattern generating circuit 20, into the data of NRZ (Non-Return to Zero) to record the same on the magnetic disk 2 and outputs the data therefrom. The wording "NRZ", which is called as a non-return to zero recording method, is a recording method in which recording is carried out using a pulse waveform having the same length of the unit symbol distance as that of the pulse in a binary signal pulse string. The adaptation is made so that the output signals from the encoder 7 are supplied to the record correction circuit 8.

The record correction circuit (write precompensation circuit (WPC)) 8, which detects a bit string of the output record signals from the encoder 7 and corrects the signals responding to the bit string, is adapted so that the record signals corrected by the record correction circuit 8 is supplied to the head IC 5.

Also, the record correction circuit 8, which compensates the record signals responding to the calculation result of the NLTS calculated by the control circuit 6, is adapted so as to supply the record signals to the head IC 5. The record correction circuit 8 is adapted so as to correct the compensation amount as equal to the above-described ratio Vab=1 or close to Vab=1 as possible to optimize the same.

The head IC 5 supplies the recording current responding to the recording data, which are supplied from the record correction circuit 8, to the magnetic head 3. Also, the head IC 5 is adapted so as to amplify the signals, which are regenerated by the magnetic head 3, and to supply the signals to the AGC circuit 9.

The AGC (automatic gain control) circuit 9, which controls the amplitude of the signals supplied from the head IC 5 at a constant level, is adapted so as to output the control signals to the FFT 15, the signal detection circuit 10 and the servo demodulation circuit 12.

The signal detection circuit 10 detects the regenerated data from the output signals from the AGC circuit 9. The decoder 11 decodes the signals detected by the signal detection circuit 10. The adaptation is made so that the decoded signals are supplied to the control circuit 6.

The servo demodulation circuit 12, which demodulates servo signals from the signals supplied from the AGC circuit 9, is adapted so as to supply the demodulated signals to the servo control circuit 13.

The servo control circuit 13 is adapted so as to generate drive control signals corresponding to the difference between the present position of the magnetic head 3 and the position in which recording or regenerating should be carried out, responding to the servo signals supplied from the servo demodulation circuit 12 and the control signals supplied from the control circuit 6, and to supply the drive control signals to the drive circuit 14.

The drive circuit 14, which generates drive signals for driving the actuator 4 responding to the drive control signals supplied from the servo control circuit 13, is adapted so as to supply the drive signals to the actuator 4.

The FFT (fast Fourier transformer) 15, which is provided at the downstream side of the AGC circuit 9, is adapted so as to detect (measure) the 5th higher harmonic component from the regenerated signals outputted from the AGC circuit 9 and to output the 5th higher harmonic component to the control circuit 6 or the like. That is, the FFT 15 is adapted so as to function as the above-described first measuring section 55 and second measuring section 56.

The control circuit 6, which controls various kinds of processing in the magnetic disk unit 100, is adapted so as to control switching the magnetic head 3, to control positioning the magnetic head 3 with respect to the magnetic disk 2, to control writing/reading the data with the magnetic head 3 or the like, and to receive the above-described recording data from the outside and supply the data to the encoder 7.

Also, in the case where measurement of NLTS is carried out in the magnetic disk unit 100, the control circuit 6 is adapted so as, for example, to receive an instruction to select the recording data of the bit string pattern constituting the reference pattern or patterns to be measured, which are supplied to the encoder 7 from the out side, and to supply the instruction to the pattern generating circuit 20. This allows the pattern generating circuit 20 to generate the reference pattern and patterns to be measured.

Further, the control circuit 6 is adapted so as to calculate the NLTS based on the 5th component Vpat of the patterns to be measured, which are measured by the FFT 15, and the 5th higher harmonic component Vref in the reference pattern or the like. That is, the control circuit 6 is adapted so as to function as the calculating section 57 that calculates the NLTS from the first predetermined higher harmonic component measured by the first measuring section 55 and the second predetermined higher harmonic component corresponding to each of the signals to be measured, which is measured by the second measuring section 56. Further, the control circuit 6 is adapted so as to supply the calculated NLTS to the record correction circuit 8.

Further, the control circuit 6 is adapted so as to supply the calculation result of the NLTS by the above-described 5th higher harmonic method to the record correction circuit 8. The record correction circuit 8 is adapted so as to supply the compensated recording signals to the head IC 5 responding to the calculation result of the supplied NLTS.

The pattern generating circuit 20 is adapted so as to generate the reference pattern (reference signal) and patterns to be measured (signals to be measured) based on the control of the control circuit 6 and to supply the reference pattern and patterns to be measured to the encoder 7, and to function as the above-described pattern generating section 51.

Figure 4:
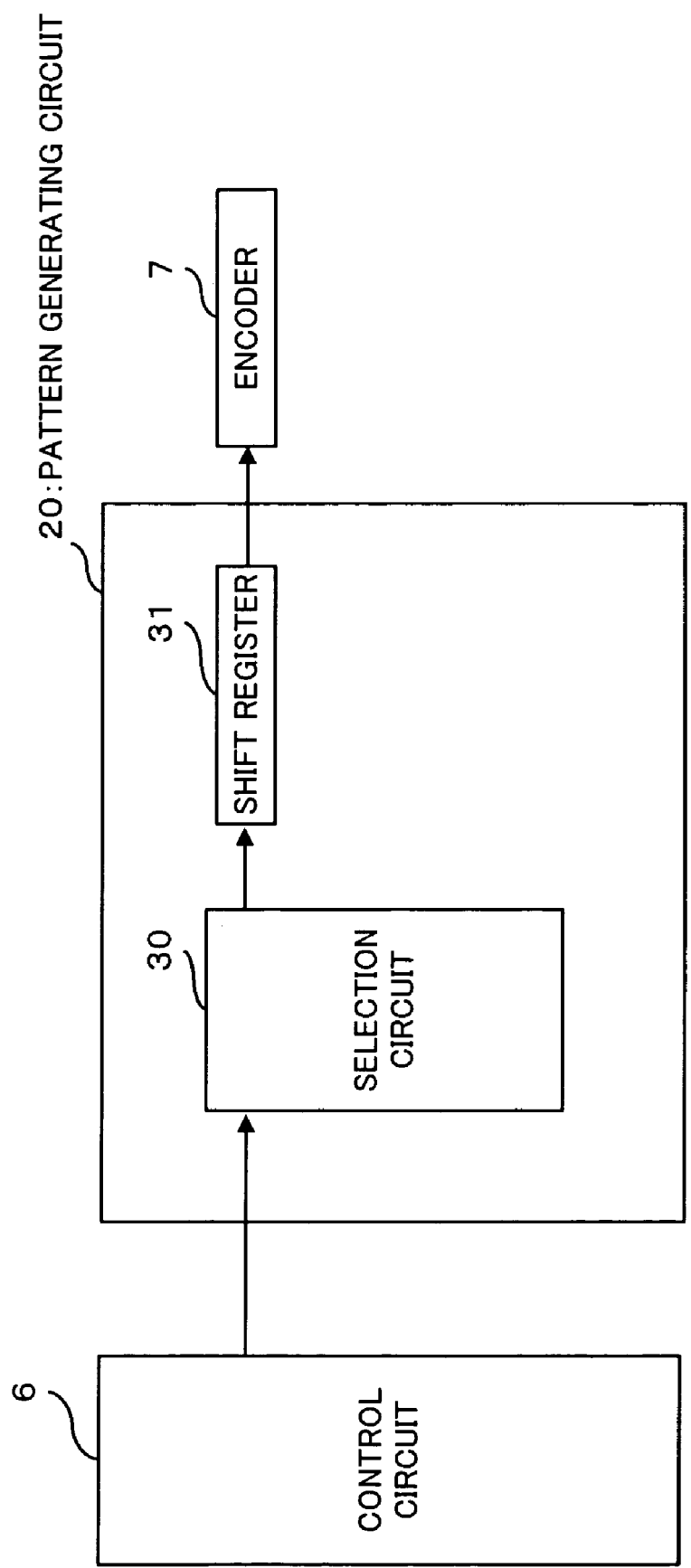
FIG. 4 is a diagram schematically showing an example of a configuration of a pattern generating circuit, which is used in the magnetic disk unit as an embodiment of the present invention.

FIG. 4 is a diagram schematically showing an example of a configuration of the pattern generating circuit 20, which is used in the magnetic disk unit 100 as an embodiment of the present invention. The pattern generating circuit 20 is adapted so as, responding to an instruction supplied from the control circuit 6, to select a reference pattern (refer to FIG.

2) as a reference signal, and one recording data (pattern) from plural kinds of patterns to be measured (NLTS pattern to be measured) as a signal to be measured, which are constituted of 60 bits, respectively, and are stored beforehand in a nonvolatile memory (not shown) in a selection circuit 30, and to supply the 60-bit recording data to a shift register 31.

The shift register 31, which is a 60-bit shift register with parallel input and serial output, is adapted so as to write 60-bit parallelly-recorded data when an S/L mode is 0, and when the S/L mode is 1, to cyclically shift the written data one bit by one bit serially at arbitrary bits to supply the same to the encoder 7.

At least a part of the above-described encoder 7, AGC circuit 9, signal detection circuit 10, decoder 11, servo demodulation circuit 12, servo control circuit 13, drive circuit 14, FFT 15, control circuit 6, record correction circuit 8 and pattern generating circuit 20 may be constituted as a magnetic recording/regenerating LSI (large scale integration).

A measuring technique of the NLTS by means of the 5th higher harmonic method in the magnetic disk unit 100 as one embodiment of the present invention, which is constituted as described above, will be described. The NLTS measuring method is constituted of the following three steps.

First of all, the reference signal (reference pattern; refer to FIG. 2) is recorded on the magnetic disk 2 using the magnetic head 3, the regenerated signal thereof is detected from the output from the AGC circuit 9, and the fifth higher harmonic signal (hereinafter, referred to as the 5th component) thereof is measured by the FFT 15 (step 1). The 5th component is defined as Vref.

Then, the pattern to be measured (refer to FIG. 2) is selected and recorded on the magnetic disk 2 similarly to the step 1, and the 5th component Vpat of the regenerated signal thereof is measured by the FFT 15 (step 2).

After calculating the ratio Vab=Vpat/Vref based on the 5th component Vref and Vpat measured in the step 1 and the step 2, the NLTS is calculated from the above-described formula (2) (step 3).

The processing of the above-described step 1 through step 3 is carried out on the patterns to be measured several times while sequentially changing the patterns to be measured in order to measure a plurality of kinds of the NLTS.

Figure 5A:
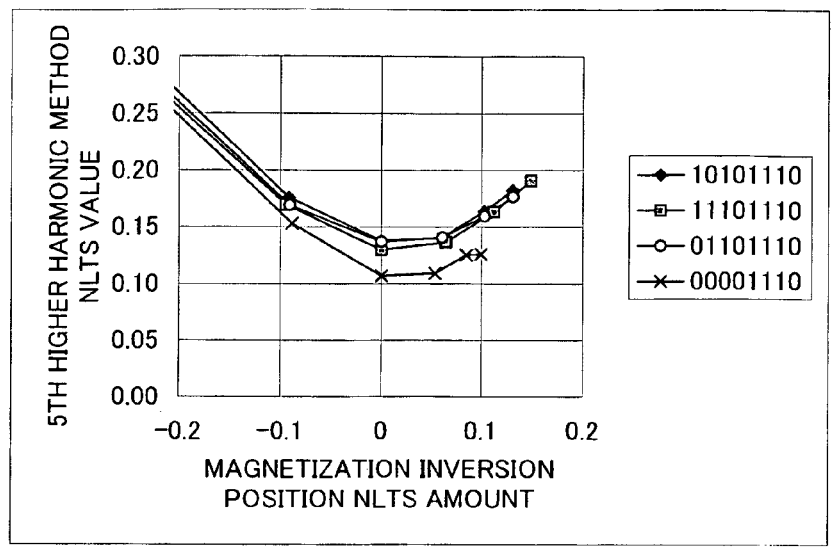
FIG. 5(a), FIG. 5(b), FIG. 5(c), FIG. 6(a), FIG. 6(b) and FIG. 6(c) are a diagram, respectively, showing an example of errors in measurements by means of a simulation of NLTS with respect to plural kinds of NLTS patterns to be measured in the magnetic disk unit as an embodiment of the present invention.
Figure 5B:
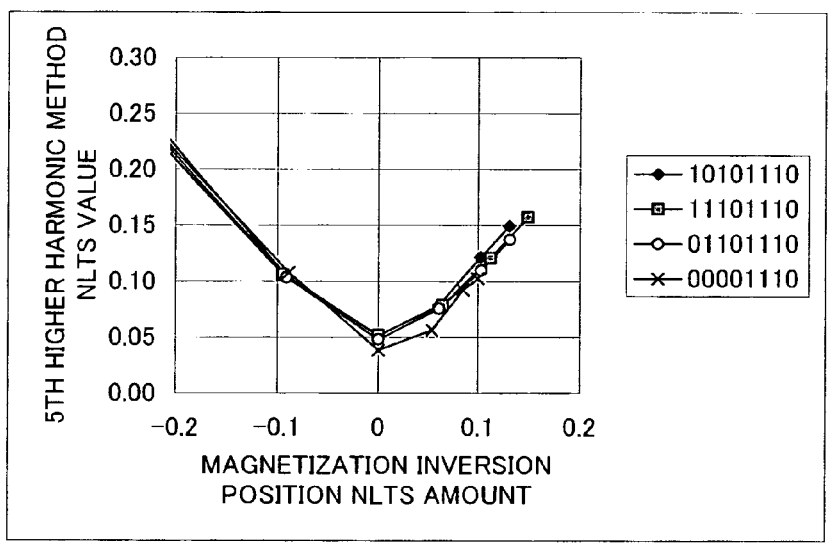
Figure 5C:
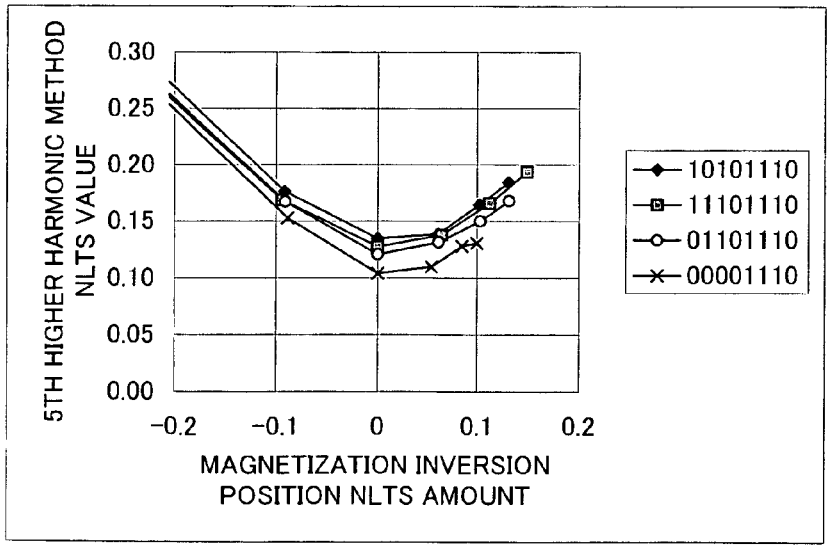
Figure 6A:
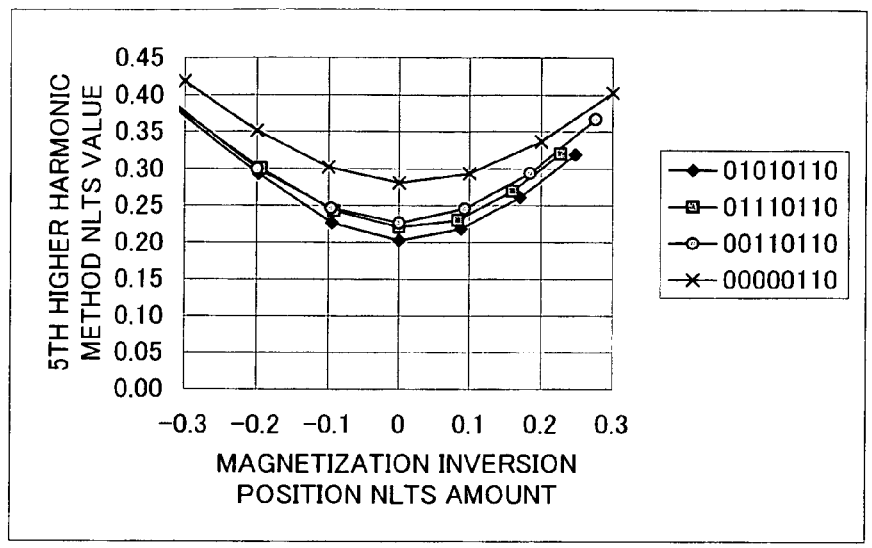

FIGS. 5(a), (b) and (c) and FIGS. 6(a), (b) and (c) are diagrams respectively showing an example of an error in measurement by a simulation of NLTS with respect to plural kinds of NLTS patterns to be measured (NLTS pattern to be measured 1010111, NLTS pattern to be measured 1110111, NLTS pattern to be measured 0110111 and NLTS pattern to be measured 0000111) in the magnetic disk unit 100 as one embodiment of the present invention. In the simulations in FIGS. 5(a) through (c) and FIGS. 6(a) through (c), the bit cycle N is 60 bits (60T; N=60), the order of the predetermined higher harmonic component is 5 (M=5), the bit length, in which the influence from the preceding bit is negligible, is δ=4T, R=N/M=12, and a GMR ρ-H curve is included.

FIGS. 5(a) through (c) are diagrams respectively showing the relationship between the NLTS amount and the NLTS value in the tribit position. FIG. 5(a) is a diagram showing the simulation result in the case where the vertical asymmetry ratio of the regenerated signals is 0% (Asym=0%); FIG. 5(b) is a diagram showing the simulation result in the case where the vertical asymmetry ratio of the regenerated signals is 10% (Asym=10%); and FIG. 5(c) is a diagram showing the simulation result in the case where the vertical asymmetry ratio of the regenerated signals is −10% (Asym=−10%).

Figure 6B:
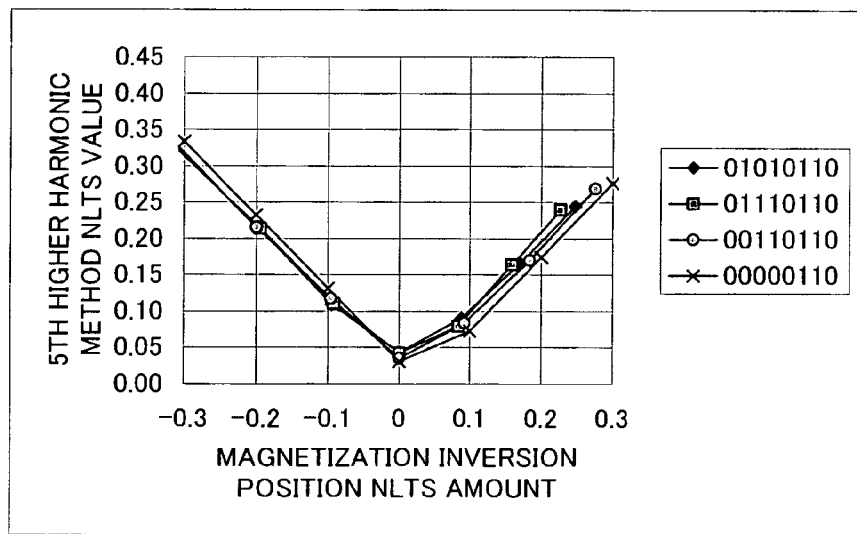
Figure 6C:
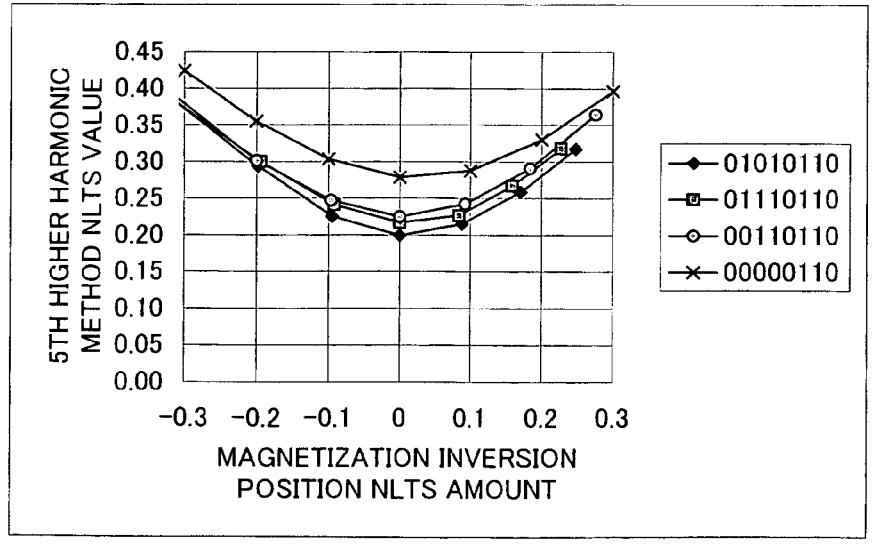

In particular, FIGS. 6(a) through (c) are diagrams respectively showing the relationship between the NLTS amount and the NLTS value in the dibit position. FIG. 6(a) is a diagram showing the simulation result in the case where the vertical asymmetry ratio of the regenerated signals is 0% (Asym=0%); FIG. 6(b) is a diagram showing the simulation result in the case where the vertical asymmetry ratio of the regenerated signals is 10% (Asym=10%); and FIG. 6(c) is a diagram showing the simulation result in the case where the vertical asymmetry ratio of the regenerated signals is −10% (Asym=−10%).

Figure 7A:
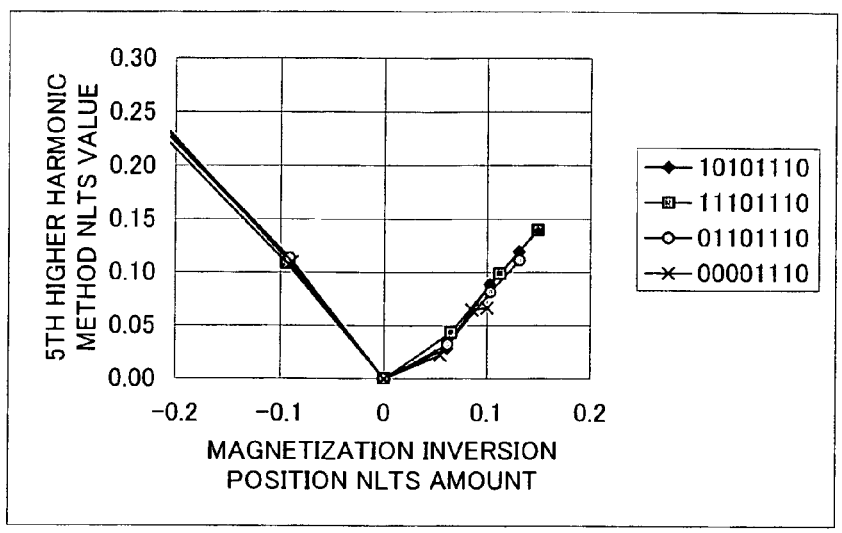
FIG. 7(a), FIG. 7(b), FIG. 7(c), FIG. 8(a), FIG. 8(b) and FIG. 8(c) are a diagram, respectively, showing an example of errors in measurements by means of a simulation of NLTS after correction with respect to the plural kinds of NLTS patterns to be measured in the magnetic disk unit as an embodiment of the present invention.
Figure 7B:
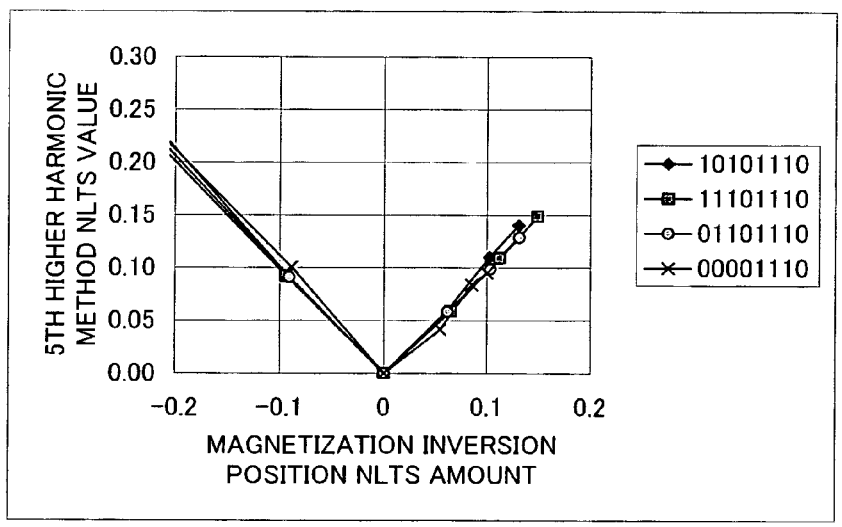
Figure 7C:
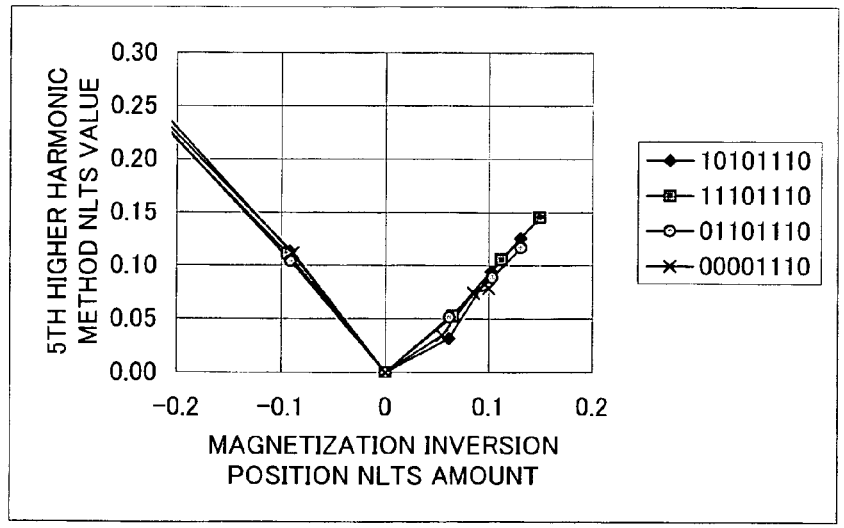
Figure 8A:
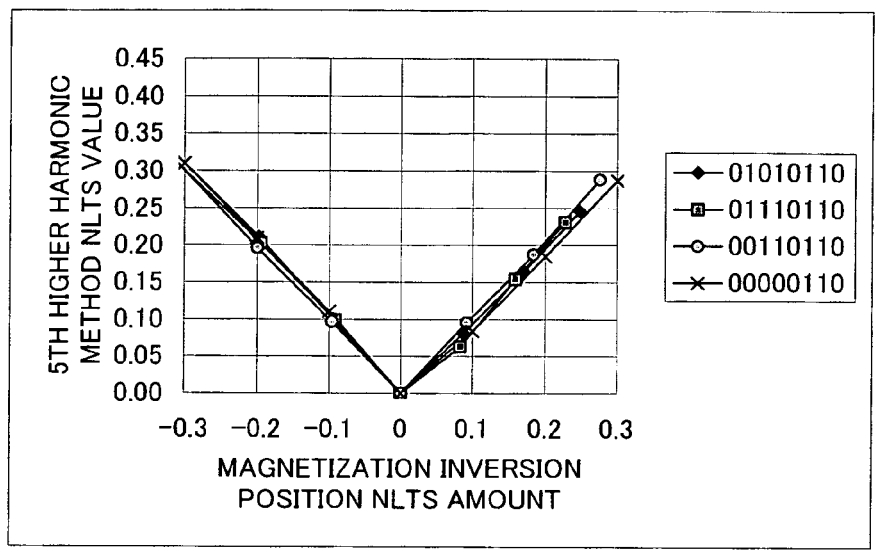

FIGS. 7(a), (b) and (c) and FIGS. 8(a), (b) and (c) are diagrams respectively showing an example of an error in measurement by a simulation of NLTS after correction with respect to plural kinds of NLTS patterns to be measured (NLTS pattern to be measured 1010111, NLTS pattern to be measured 1110111, NLTS pattern to be measured 0110111 and NLTS pattern to be measured 0000111) in the magnetic disk unit 100 as one embodiment of the present invention. In the simulations in FIGS. 7(a) through (c) and FIGS. 8(a) through (c), the bit cycle N is 60 bits (60T; N=60), the order of the predetermined higher harmonic component is 5 (M=5), the bit length, in which the influence from the preceding bit is negligible, is δ=4T, R=N/M=12, and a GMR ρ-H curve is included.

In particular, FIGS. 7(a) through (c) are diagrams respectively showing the relationship between the NLTS amount and the NLTS value in the tribit position. FIG. 7(a) is a diagram showing the simulation result in the case where the vertical asymmetry ratio of the regenerated signals is 0% (Asym=0%); FIG. 7(b) is a diagram showing the simulation result in the case where the vertical asymmetry ratio of the regenerated signals is 10% (Asym=10%); and FIG. 7(c) is a diagram showing the simulation result in the case where the vertical asymmetry ratio of the regenerated signals is −10% (Asym=−10%).

Figure 8B:
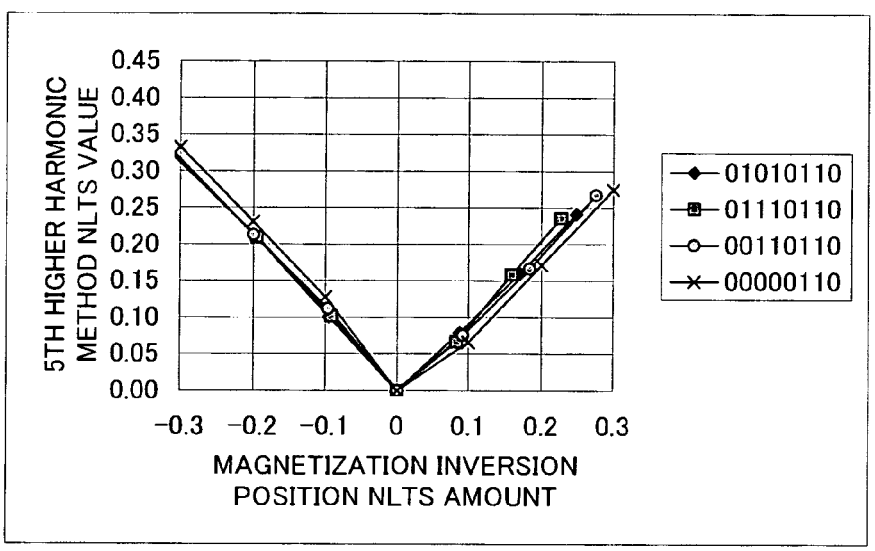
Figure 8C:
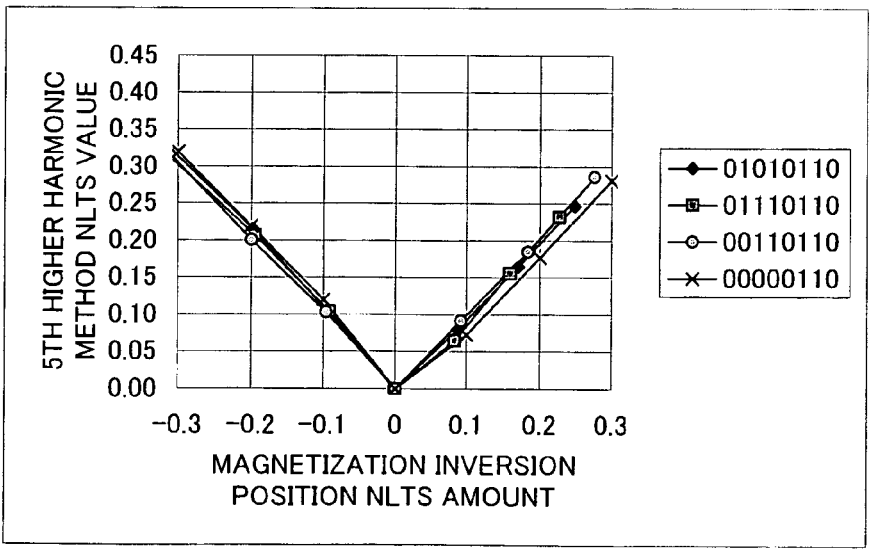

Also, FIGS. 8(a) through (c) are diagrams respectively showing the relationship between the NLTS amount and the NLTS value in the dibit position. FIG. 8(a) is a diagram showing the simulation result in the case where the vertical asymmetry ratio of the regenerated signals is 0% (Asym=0%); FIG. 8(b) is a diagram showing the simulation result in the case where the vertical asymmetry ratio of the regenerated signals is 10% (Asym=10%); and FIG. 8(c) is a diagram showing the simulation result in the case where the vertical asymmetry ratio of the regenerated signals is −10% (Asym=−10%).

Figure 9A:
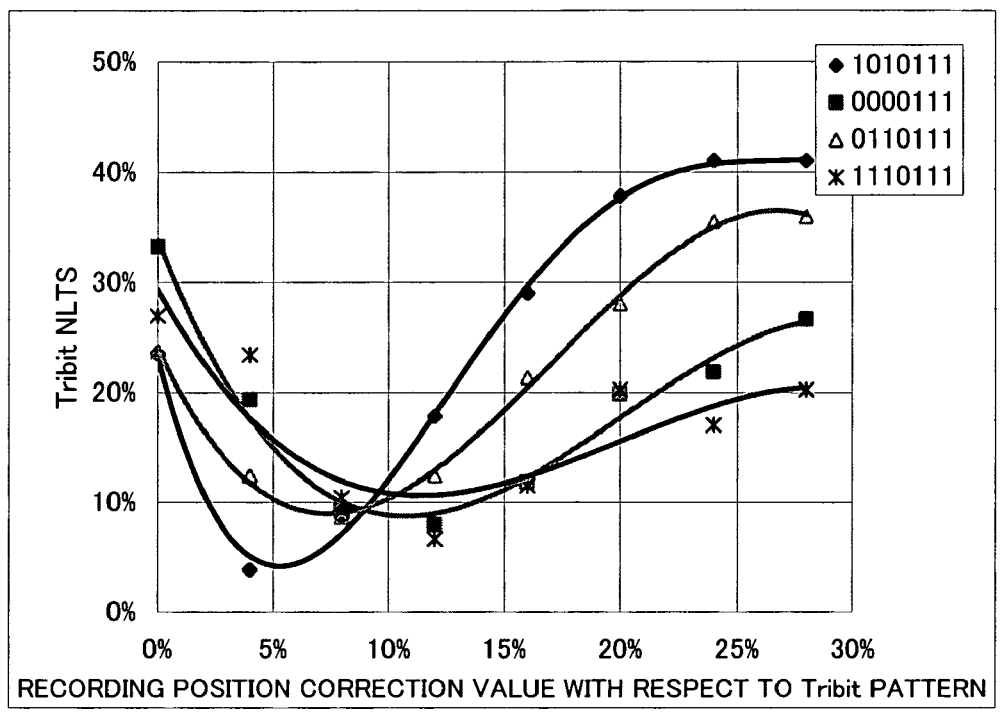
FIG. 9(a), FIG. 9(b), FIG. 10(a), FIG. 10(b), FIG. 11(a), FIG. 11(b), FIG. 12(a) and FIG. 12(b) are a diagram, respectively, showing actually measured examples of NLTS with respect to the plural kinds of NLTS patterns to be measured in the magnetic disk unit as an embodiment of the present invention.
Figure 10A:
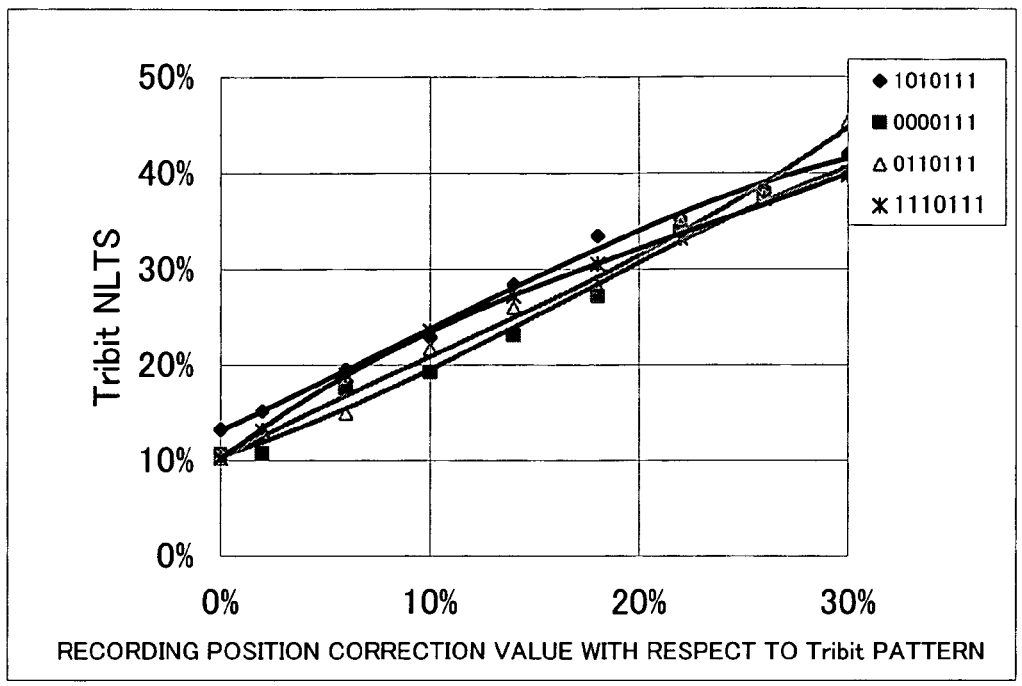
Figure 11A:
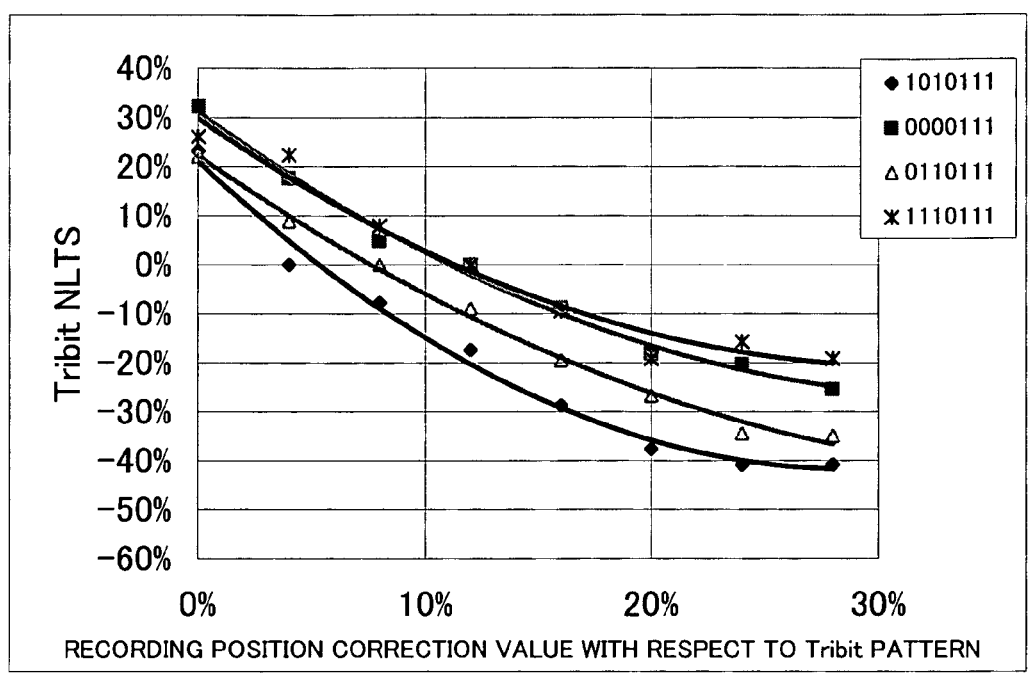
Figure 12A:
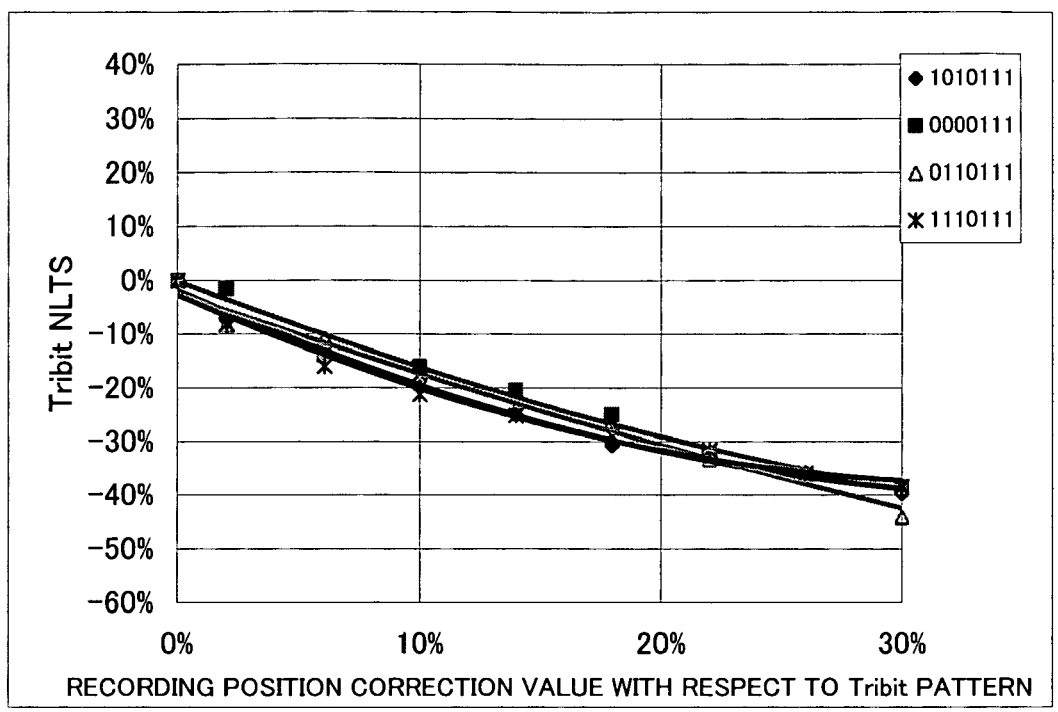

FIGS. 9(a) and (b), FIGS. 10(a) and (b), FIGS. 11(a) and (b) and FIGS. 12(a) and (b) are diagrams respectively showing actually measured examples of NLTS with respect to plural kinds of NLTS patterns to be measured in the magnetic disk unit 100 as one embodiment of the present invention.

Figure 9B:
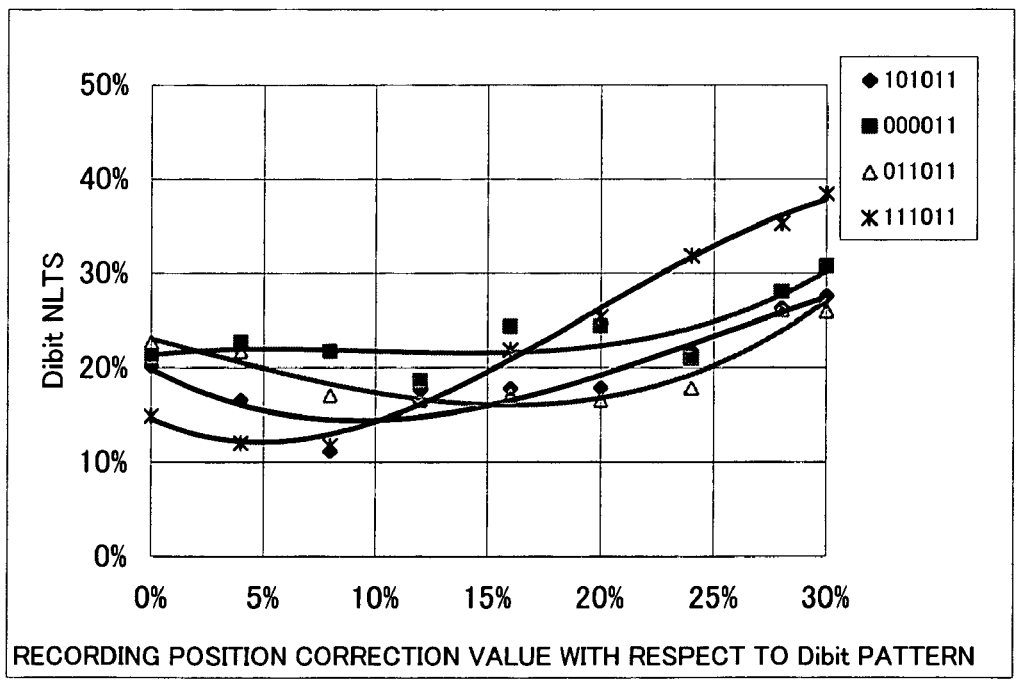

In particular, FIGS. 9(a) and (b) are diagrams respectively showing an example when the NLTS is measured with respect to the magnetic head 3 having an incorrect error rate without carrying out nonlinearity correction. FIG. 9(a) is a diagram showing the measurement result with respect to plurality of tribits (NLTS pattern to be measured 1010111, NLTS pattern to be measured 0000111, NLTS pattern to be measured 0110111 and NLTS pattern to be measured 1110111). FIG. 9(b) is a diagram showing the measurement result with respect to plurality of dibits (NLTS pattern to be measured 101011, NLTS pattern to be measured 000011, NLTS pattern to be measured 011011 and NLTS pattern to be measured 111011).

Figure 10B:
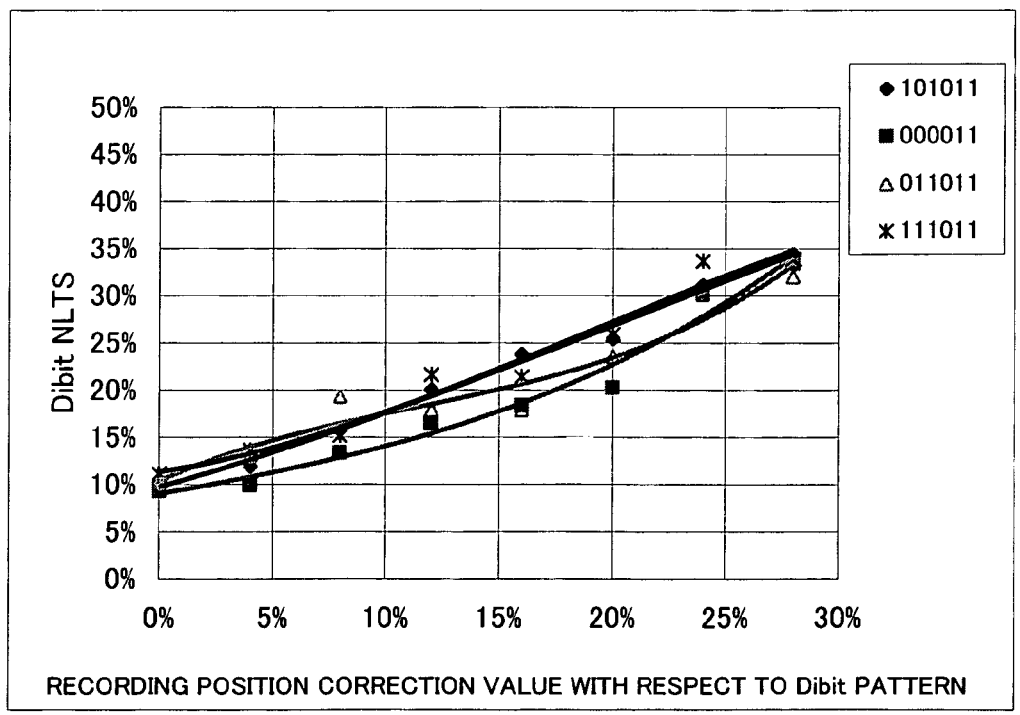

Also, FIGS. 10(a) and (b) are diagrams respectively showing an example when the NLTS is measured with respect to the normal magnetic head 3 without carrying out nonlinearity correction. FIG. 10(a) is a diagram showing the measurement result with respect to plurality of tribits (NLTS pattern to be measured 1010111, NLTS pattern to be measured 0000111, NLTS pattern to be measured 0110111 and NLTS pattern to be measured 1110111). FIG. 10(b) is a diagram showing the measurement result with respect to plurality of dibits (NLTS pattern to be measured 101011, NLTS pattern to be measured 000011, NLTS pattern to be measured 011011 and NLTS pattern to be measured 111011).

Figure 11B:
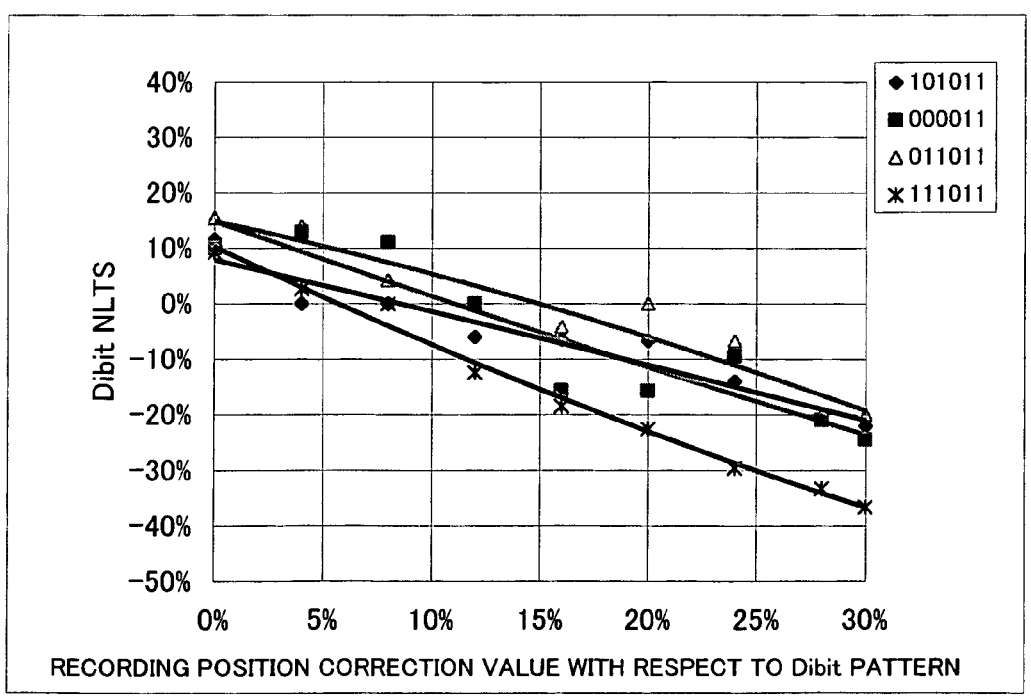

FIGS. 11(a) and (b) are diagrams respectively showing an example when the NLTS is measured with respect to the magnetic head 3 having an incorrect error rate after carrying out nonlinearity correction. FIG. 11(a) is a diagram showing the measurement result with respect to a plurality of tribits (NLTS pattern to be measured 1010111, NLTS pattern to be measured 0000111, NLTS pattern to be measured 0110111 and NLTS pattern to be measured 1110111). FIG. 11(b) is a diagram showing the measurement result with respect to a plurality of dibits (NLTS pattern to be measured 101011, NLTS pattern to be measured 000011, NLTS pattern to be measured 011011 and NLTS pattern to be measured 111011).

Figure 12B:
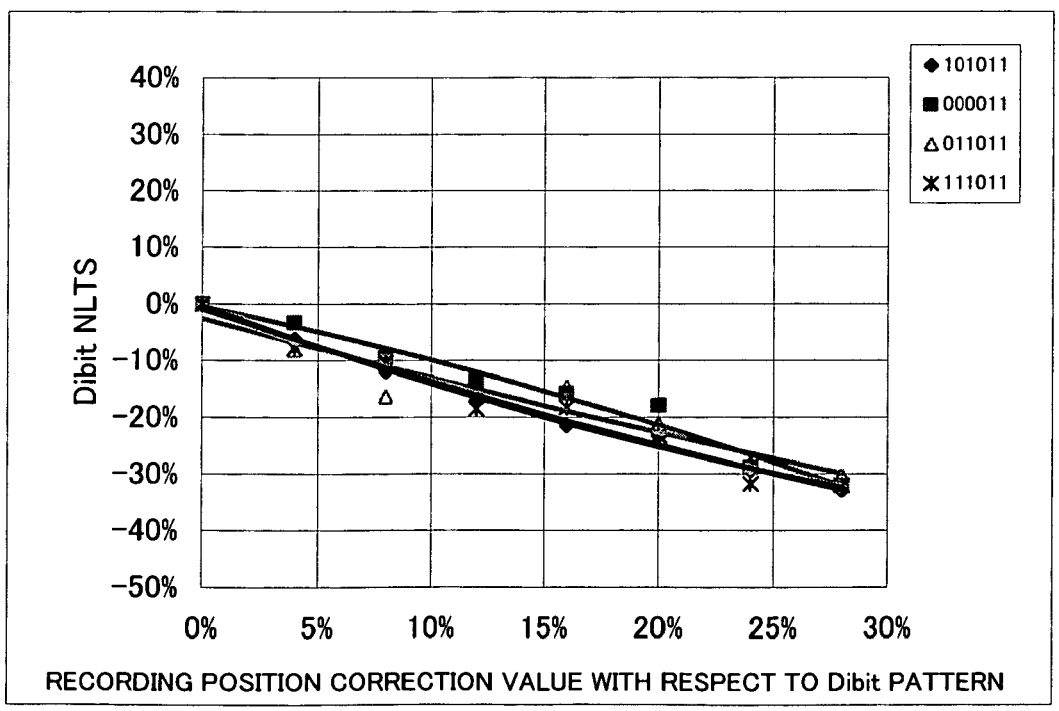

FIGS. 12(a) and (b) are diagrams respectively showing an example when the NLTS is measured with respect to the normal magnetic head 3 after nonlinearity correction. FIG. 12(a) is a diagram showing the measurement result with respect to a plurality of tribits (NLTS pattern to be measured 1010111, NLTS pattern to be measured 0000111, NLTS pattern to be measured 0110111 and NLTS pattern to be measured 1110111). FIG. 12(b) is a diagram showing the measurement result with respect to a plurality of dibits (NLTS pattern to be measured 101011, NLTS pattern to be measured 000011, NLTS pattern to be measured 011011 and NLTS pattern to be measured 111011).

FIGS. 9(a) and (b), FIGS. 10(a) and (b), FIGS. 11(a) and (b) and FIGS. 12(a) and (b) demonstrate the following fact. That is, the difference of the NLTS amount depending on the preceding pattern P1 in the normal magnetic head 3 is approximately 2%; and in the incorrect magnetic head 3, the difference of the NLTS amount depending on the preceding pattern P1 is approximately 20%.

In the above actually measured example, an example of NLTS depending on the preceding pattern P1 caused by the magnetic head 3 is shown. However, the NLTS is not limited to the above. It is easily surmised that the NLTS might be generated in the magnetic disk (medium) 2 and/or a record transmission path (not shown) as well.

Next, generation algorithm of the reference pattern (reference signal) and the patterns to be measured (signals to be measured), which is used in the nonlinearity measuring section 1 of the magnetic disk unit 100, will be described.

The reference pattern and patterns to be measured used in the nonlinearity measuring section 1 of the magnetic disk unit 100 is not limited to those shown in FIG. 2. The other reference pattern and patterns to be measured that satisfy the following conditions may be used. The bit length δ should be a value in which the influence from the preceding bit is negligible.

(1) The M-th higher harmonic component of the order number M is obtained respectively from the regenerated signal of the reference pattern magnetically recorded in the magnetic disk 2 and the regenerated signals of the patterns to be measured magnetically recorded in the magnetic disk 2 in a similar manner. When each of the reference signal and the plural kinds of signals to be measured are constituted of a bit string with a bit cycle N, the bit cycle N is a multiple number of the M-th order of the predetermined higher harmonic component, and the ratio R (R=N/M) of the bit cycle N with respect to the higher harmonic component M is a multiple number of 2.

(2) The reference pattern includes a first magnetization inversion bit R1 at the first position and a second magnetization inversion bit R2 at the following point δ bits or more away from the first magnetization inversion bit R1 and yet a third magnetization inversion bit R3 at the following point δ bits or more away from the second magnetization inversion bit R2, and yet at the following point of the n4×R-th (n4 is a natural number) from the first magnetization inversion bit R1; and a fourth magnetization inversion bit R4 at a following point δ bits or more away from the third magnetization inversion bit R3, at a preceding point δ bits or more away from the last bit (the N-th bit from the first bit) of the reference pattern, and yet at a following point of the (n5+0.5) R-th (n5 is a natural number) from the second magnetization inversion bit R2.

(3) The patterns to be measured have a bit string P2, in which the last bit of the NLTS measuring pattern P is excluded, disposed at a following point 2δ bits (δ is a bit length allowing the influence of the NLTS from a preceding bit on the medium to be neglected) or more away from the last bit of the NLTS measuring pattern string P constituted of the magnetization inversion pattern P1 and objective bit to be measured of the nonlinearity, and yet with a following point of the (n1+0.5) R-th (n1 is a natural number) from the first bit of the NLTS measuring pattern string P assumed to be a starting point, and the signals to be measured include a first magnetization inversion bit C1 at a following point δ bits or more away from the last bit of the magnetization inversion pattern P1, at a preceding point 2δ bits or more away from the last bit (the N-th bit) of the pattern to be measured, and yet at a following point of the (n2+0.5) R-th (n2 is a natural number) from the last bit of the NLTS measuring pattern string P.

(4) When the number of the magnetization inversion bit in the NLTS measuring pattern string P is an odd number, the signal to be measured includes a second magnetization inversion bit C2 at a following point δ bits or more away from the last bit of the NLTS measuring pattern string P, and yet at a preceding point δ or more away from the first bit of the bit string P2 pattern; and a third magnetization inversion bit C3 at a following point δ bits or more away from the first magnetization inversion pattern C1, at a preceding point δ bits or more away from the last bit of the pattern to be measured, and yet at a following point of the (n3+0.5) R-th (n3 is a natural number) from the second magnetization inversion bit C2.

In the nonlinearity measuring section 1 of the magnetic disk unit 100, the NLTS may be measured using any of the reference pattern and the patterns to be measured that satisfies the above conditions (1) through (4).

FIG. 13 is a diagram showing an example of the other reference pattern and patterns to be measured, which are used in the nonlinearity measuring section 1 of the magnetic disk unit 100 as one embodiment of the present invention. The reference pattern and patterns to be measured shown in FIG. 13 satisfy the above-described conditions (1) through (4), and each of the reference pattern and the patterns to be measured is constituted of a bit string of 0 and 1 of which the bit cycle N is 50 bits (50T; N=50), and the magnetization inversion position is represented by 1.

As described above, according to the magnetic disk unit 100 (nonlinearity measuring section 1) as one embodiment of the present invention, by calculating the NLTS based on the predetermined higher harmonic component (5th component) in the pattern to be measured, which is provided with the pattern P1 preceding the objective bit to be measured of the NLTS, the NLTS depending on the preceding pattern P1 can be quantitatively measured easily. Thus, a large effect is exercised to develop magnetic disk units (magnetic head, electric transmission system or the like) or mediums.

Also, the correction can be easily carried out so that the NLTS is minimized, and for optimizing the write precompensation circuit (WPC), the value of the ratio Vab of the 5th components of the reference signal and each of the signals to be measured can be used without requiring any calculation of the NLTS using the calculation formulas. Thus the correction can be made easily.

Further, according to the present invention, the NLTS can be measured using only the magnetic disk unit 100.

The present invention is not limited to the above-described embodiment. The present invention may be carried out in various kinds of modifications within a range of the sprit of the present invention.

For example, in the above-described embodiment, the description has been made as to the case where the first predetermined higher harmonic component measured by the first measuring section 55 and the second predetermined higher harmonic component measured by the second measuring section 56 are the fifth higher harmonic component of the order 5 (M=5). However, these predetermined higher harmonic components are not limited to the fifth higher harmonic component, but higher harmonic components of the order other than 5 may be used. Further, the first predetermined higher harmonic component and the second predetermined higher harmonic component may differ from each other in the order. The present invention may be carried out in various kinds of modifications within a range of the sprit of the present invention.

Further, the pattern generating section 51 may output the inverted reference signal created by inverting the magnetization polarity of the above-described reference pattern (reference signal) as the reference signal, and also may output the inverted signals to be measured, which are created by inverting the magnetization polarity of the patterns to be measured (signals to be measured) respectively, as the signals to be measured. By measuring the predetermined higher harmonic component as described above based on these inverted reference signal and inverted signals to be measured to calculate the NLTS, a difference in NLTS polarities also can be measured using the same preceding pattern.

In the magnetic recording/regenerating, two polarities are outputted alternately depending on the direction of the magnetization inversion. For example, in the regenerated signals of the dibit pattern, the following two cases are conceivable; i.e., the case of amplitude having the plus polarity at the first bit and the minus polarity at the second bit, and the case of amplitude having the minus polarity at the first bit and the plus polarity at the second bit. Since the patterns to be measured used in the nonlinearity measuring section 1 of the magnetic disk unit 100 have even magnetization inversion data, also in the patterns to be measured that are generated by inverting the magnetization polarity of the patterns to be measured, two polarities can be generated.

As for the generation of these inverted reference signal and inverted signals to be measured, an inverting section for inverting the magnetization polarity of the reference pattern and the patterns to be measured generated from the pattern generating section 51 may be provided, and this inverting section may invert the magnetization polarity.

Also, in the above-described embodiment, the pattern generating circuit 20 (pattern generating section 51) generates patterns (reference pattern and patterns to be measured) of the reference signal and the signals to be measured. However, the present invention is not limited to the above. For example, the present invention may be constituted so that the control circuit 6 receives the pattern signals of the reference signal and the signals to be measured from the outside, and the received pattern signals are supplied to the head IC 5 via the record correction circuit 8 to record and regenerate the same.

Further, in the above-described embodiment, the FFT 15 is provided at the downstream side of the AGC circuit 9. However, the present invention is not limited to the above. For example, the FFT 15 may be provided at a position at the downstream side of the head IC 5 as well as the upstream side of the AGC circuit 9.

Also, in the above-described embodiment, the control circuit 6 is adapted so as to function as the calculating section 57 that calculates the NLTS from the first predetermined higher harmonic component measured by the first measuring section 55 and the second predetermined higher harmonic component corresponding to each of the signals to be measured, which are measured by the second measuring section 56. However, the present invention is not limited to the above. A circuit or the like, which functions as the calculating section 57, may be provided separately from the control circuit 6.

Further, in the above-described embodiment, the case where the first predetermined higher harmonic component, which is measured based on the regenerated signal of the reference pattern, and the second predetermined higher harmonic components, which are measured based on the regenerated signals of the patterns to be measured, are the M-th higher harmonic component of the same order, has been described. However, the present invention is not limited to the above. The first predetermined higher harmonic component and the second predetermined higher harmonic component may differ from each other in the order.

In the case where the embodiments of the present invention are disclosed, one skilled in the art can manufacture the same.

INDUSTRIAL APPLICABILITY

As described above, the nonlinearity measuring method, the nonlinearity measuring unit, the magnetic recording/regenerating unit and the magnetic recording/regenerating LSI according to the present invention are useful for carrying out measurement of non linear transition shift in magnetic recording/generating in a medium. Particularly, the present invention is suitable for NLTS measurement with a high precision having the state of the magnetization inversion of the bit string preceding the patterns to be measured taken into consideration.

The invention claimed is:

1. A nonlinearity measuring method of calculating non linear transition shift (NLTS) in magnetic recording/regenerating in a medium, comprising:

a recording step of a reference signal to record a reference signal on the medium;

a recording step of signals to be measured to record plural kinds of signals to be measured on the medium, a first measuring step to measure a first predetermined higher harmonic component from a regenerated signal of the reference signal magnetically recorded on said medium;

a second measuring step to measure a second predetermined higher harmonic component from its regenerated signal with respect to each of the plural kinds of signals to be measured magnetically recorded on said medium; and a calculating step to calculate the NLTS from said first predetermined higher harmonic component and said second predetermined higher harmonic component corresponding to each of the signals to be measured, wherein each of said plural kinds of signals to be measured includes a magnetization inversion pattern string P1 preceding objective bits to be measured of said NLTS.

2. The nonlinearity measuring method according to claim 1, wherein each of the first predetermined higher harmonic component and the second predetermined higher harmonic components is an M-th higher harmonic component of the M-th order, and wherein each of the reference signal and said plural kinds of signals to be measured is constituted of a bit string with a bit cycle N, the bit cycle N is a multiple number of the M-th order of said predetermined higher harmonic component, and the ratio R (R=N/M) of the bit cycle N with respect to the higher harmonic component M is a multiple number of 2.

3. The nonlinearity measuring method according to claim 2, wherein the signals to be measured have a bit string P2, in which the last bit of the NLTS measuring pattern P is excluded, disposed at a following point 2d bits (d is a bit length allowing the influence of the NLTS from a preceding bit on the medium to be neglected) or more away from the last bit of the NLTS measuring pattern string P constituted of the magnetization inversion pattern P1 and objective bit to be measured of said nonlinearity, and yet with a following point of the (n1+0.5) R-th (n1 is a natural number) from the first bit of the NLTS measuring pattern string P assumed to be a starting point, and wherein the signals to be measured include a first magnetization inversion bit C1 at a following point d bits or more away from the last bit of the magnetization inversion pattern P1, at a preceding point 2d bits or more away from the last bit of the signals to be measured, and yet at a following point of the (n2+0.5) R-th (n2 is a natural number) from the last bit of the NLTS measuring pattern string P.

4. The nonlinearity measuring method according to claim 3, wherein, when the number of the magnetization inversion bit in the NLTS measuring pattern string P is an odd number, the signal to be measured includes:

a second magnetization inversion bit C2 at a following point d bits or more away from the last bit of the NLTS measuring pattern string P, and yet at a preceding point d or more away from the first bit of the bit string P2 pattern; and a third magnetization inversion bit C3 at a following point d bits or more away from the first magnetization inversion pattern C1, at a preceding point d bits or more away from the last bit of the signals to be measured, and yet at a following point of the (n3+0.5) R-th (n3 is a natural number) from the second magnetization inversion bit C2.

5. The nonlinearity measuring method as in claim 2, wherein the reference signal includes:

a first magnetization inversion bit R1 at the first position;

a second magnetization inversion bit R2 at the following point d bits or more away from the first magnetization inversion bit R1;

a third magnetization inversion bit R3 at the following point d bits or more away from the second magnetization inversion bit R2, and yet at the following point of the n4'R-th (n4 is a natural number) from the first magnetization inversion bit R1; and a fourth magnetization inversion bit R4 at a following point d bits or more away from the third magnetization inversion bit R3, at a preceding point d bits or more away from the last bit of the reference signal, and yet at a following point of the (n5+0.5) R-th (n5 is a natural number) from the second magnetization inversion bit R2.

6. The nonlinearity measuring method as in claim 1, wherein, in the calculating step, the NLTS is calculated based on the ratio of said first predetermined higher harmonic component and said second predetermined higher harmonic component.

7. The nonlinearity measuring method as claim 1, wherein inversed signals to be measured, which are created by inverting the magnetization polarity of the signals to be measured, are used as the signals to be measured.

8. The nonlinearity measuring method as in claim 1, further comprising, in the recording step of signals to be measured, an alteration step for enabling alteration of the recording position of the objective bit to be measured of said nonlinearity in the signals to be measured, wherein, in the second measuring step, said second predetermined higher harmonic component is measured based on the signals to be measured after altering said recording position.

9. The nonlinearity measuring method as in claim 1, wherein each of the reference signal and said plural kinds of signals to be measured is a bit string with a bit cycle 60 (N=60), and each of the first predetermined higher harmonic component and the second predetermined higher harmonic component is a fifth higher harmonic component of the 5th order (M=5).

10. The nonlinearity measuring method as in claim 1, wherein each of the reference signal and said plural kinds of signals to be measured is a bit string with a bit cycle 50 (N=50), and each of the first predetermined higher harmonic component and the second predetermined higher harmonic component is a fifth higher harmonic component of the 5th order (M=5).

11. A nonlinearity measuring unit for calculating non linear transition shift (NLTS) in magnetic recording/regenerating in a medium, comprising:

a first measuring section measuring a first predetermined higher harmonic component from a regenerated signal of a reference signal magnetically recorded on the medium;

a second measuring section measuring a second predetermined higher harmonic component from its regenerated signal with respect to each of the plural kinds of signals to be measured magnetically recorded on the medium; and a calculating section calculating the NLTS from said first predetermined higher harmonic component and said second predetermined higher harmonic component corresponding to each of the signals to be measured, wherein each of said plural kinds of signals to be measured includes a magnetization inversion pattern string P1 preceding objective bits to be measured of said NLTS.

12. The nonlinearity measuring unit according to claim 11, wherein each of the first predetermined higher harmonic component and the second predetermined higher harmonic component is an M-th higher harmonic component of the M-th order, and
wherein each of the reference signal and said plural kinds of signals to be measured is constituted of a bit string with a bit cycle N, the bit cycle N is a multiple number of the M-th order of said predetermined higher harmonic component, and the ratio R (R=N/M) of the bit cycle N with respect to the higher harmonic component M is a multiple number of 2.

13. A magnetic recording/regenerating unit, comprising:
a first measuring section for measuring a first predetermined higher harmonic component from a regenerated signal of a reference signal magnetically recorded on a medium;
a second measuring section for measuring a second predetermined higher harmonic component from its regenerated signal with respect to each of the plural kinds of signals to be measured magnetically recorded on the medium; and
a calculating section for calculating non linear transition shift (NLTS) in magnetic recording/regenerating in the medium from said first predetermined higher harmonic component and said second predetermined higher harmonic component corresponding to each of the signals to be measured,
wherein each of said plural kinds of signals to be measured includes a magnetization inversion pattern string P1 preceding objective bits to be measured of said NLTS.

14. The magnetic recording/regenerating unit according to claim 13, wherein each of the first predetermined higher harmonic component and the second predetermined higher harmonic component is an M-th higher harmonic component of the M-th order, and
wherein each of the reference signal and said plural kinds of signals to be measured is constituted of a bit string with a bit cycle N, the bit cycle N is a multiple number of the M-th order of said predetermined higher harmonic component, and the ratio R (R=N/M) of the bit cycle N with respect to the higher harmonic component M is a multiple number of 2.

15. The magnetic recording/regenerating unit according to claim 14, wherein the signals to be measured have a bit string P2, in which the last bit of the NLTS measuring pattern P is excluded, disposed at a following point 2d bits (d is a bit length allowing the influence of the NLTS from a preceding bit on the medium to be neglected) or more away from the last bit of the NLTS measuring pattern string P constituted of the magnetization inversion pattern P1 and objective bit to be measured of said nonlinearity, and yet with a following point of the (n1+0.5) R-th (n1 is a natural number) from the first bit of the NLTS measuring pattern string P assumed to be a starting point, and
where the signals to be measured include a first magnetization inversion bit C1 at a following point d bits or more away from the last bit of the magnetization inversion pattern P1, at a preceding point 2d bits or more away from the last bit of the signals to be measured, and yet at a following point of the (n2+0.5) R-th (n2 is a natural number) from the last bit of the NLTS measuring pattern string P.

16. The magnetic recording/regenerating unit according to claim 14, wherein the reference signal includes:
a first magnetization inversion bit R1 at the first position;
a second magnetization inversion bit R2 at the following point d bits or more away from the first magnetization inversion bit R1;
a third magnetization inversion bit R3 at the following point d bits or more away from the second magnetization inversion bit R2, and yet at the following point of the n4'R-th (n4 is a natural number) from the first magnetization inversion bit R; and
a fourth magnetization inversion bit R4 at a following point d bits or more away from the third magnetization inversion bit R3, at a preceding point d bits or more away from the last bit of the reference signal, and yet at a following point of the (n5+0.5) R-th (n5 is a natural number) from the second magnetization inversion bit R2.

17. An LSI for magnetic recording/regenerating, comprising:
a first measuring section measuring a first predetermined higher harmonic component from a regenerated signal of a reference signal magnetically recorded on a medium;
a second measuring section measuring a second predetermined higher harmonic component from its regenerated signal with respect to each of the plural kinds of signals to be measured magnetically recorded on the medium; and
a calculating section calculating non linear transition shift (NLTS) in magnetic recording/regenerating in the medium from said first predetermined higher harmonic component and said second predetermined higher harmonic component corresponding to each of the signals to be measured,
wherein each of said plural kinds of signals to be measured includes a magnetization inversion pattern string P1 preceding objective bits to be measured of said NLTS.

18. The LSI for magnetic recording/regenerating according to claim 17, wherein each of the first predetermined higher harmonic component and the second predetermined higher harmonic component is an M-th higher harmonic component of the M-th order, and
wherein each of the reference signal and said plural kinds of signals to be measured is constituted of a bit string with a bit cycle N, the bit cycle N is a multiple number of the M-th order of said predetermined higher harmonic component, and the ratio R (R=N/M) of the bit cycle N with respect to the higher harmonic component M is a multiple number of 2.

19. The LSI for magnetic recording/regenerating according to claim 18, wherein the signals to be measured have a bit string P2, in which the last bit of the NLTS measuring pattern P is excluded, disposed at a following point 2d bits (d is a bit length allowing the influence of the NLTS from a preceding bit on the medium to be neglected) or more away from the last bit of the NLTS measuring pattern string P constituted of the magnetization inversion pattern P1 and objective bit to be measured of said nonlinearity, and yet with a following point of the (n1+0.5) R-th (n1 is a natural number) from the first bit of the NLTS measuring pattern string P assumed to be a starting point, and where the signals to be measured include a first magnetization inversion bit C1 at a following point d bits or more away from the last bit of the magnetization inversion pattern P1, at a preceding point 2d bits or more away from the last bit of the signals to be measured, and yet at a following point of the (n2+0.5) R-th (n2 is a natural number) from the last bit of the NLTS measuring pattern string P.

20. The LSI for magnetic recording/regenerating according to claim 18, wherein the reference signal includes:
a first magnetization inversion bit R1 at the first position;
a second magnetization inversion bit R2 at the following point d bits or more away from the first magnetization inversion bit R1;
a third magnetization inversion bit R3 at the following point d bits or more away from the second magnetization inversion bit R2, and yet at the following point of the n4'R-th (n4 is a natural number) from the first magnetization inversion bit R1, and
a fourth magnetization inversion bit R4 at a following point d bits or more away from the third magnetization inversion bit R3, at a preceding point d bits or more away from the last bit of the reference signal, and yet at a following point of the (n5+0.5) R-th (n5 is a natural number) from the second magnetization inversion bit R2.

* * * * *

UNITED STATES PATENT AND TRADEMARK OFFICE
CERTIFICATE OF CORRECTION

| | | |
|---|---|---|
| PATENT NO. | : 7,248,424 B2 | Page 1 of 1 |
| APPLICATION NO. | : 11/120114 | |
| DATED | : July 24, 2007 | |
| INVENTOR(S) | : Hiroaki Ueno | |

It is certified that error appears in the above-identified patent and that said Letters Patent is hereby corrected as shown below:

IN THE ISSUED PATENT:

In the Claims:

Column 24, line 14, delete "bit R" and insert --bit R1--.

Signed and Sealed this

Twenty-ninth Day of April, 2008

JON W. DUDAS
*Director of the United States Patent and Trademark Office*